(12) United States Patent
Tague et al.

(10) Patent No.: US 10,037,359 B2
(45) Date of Patent: Jul. 31, 2018

(54) SEARCH RESULTS USING SOCIAL ROUTING OF CONTENT

(71) Applicant: Microsoft Technology Licensing, LLC, Redmond, WA (US)

(72) Inventors: Matthew Steven Tague, San Mateo, CA (US); Peter Hume Rigano, San Francisco, CA (US); John Brendan Browne, Menlo Park, CA (US); Lorenzo Canlas, Oakland, CA (US); Qiang Zhu, Sunnyvale, CA (US); Keqing Liang, Sunnyvale, CA (US); Rebecca Page White, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/162,007

(22) Filed: May 23, 2016

(65) Prior Publication Data

US 2017/0337247 A1 Nov. 23, 2017

(51) Int. Cl.
*G06F 17/30* (2006.01)
*H04L 29/08* (2006.01)

(52) U.S. Cl.
CPC .. *G06F 17/30528* (2013.01); *G06F 17/30327* (2013.01); *G06F 17/30554* (2013.01); *H04L 67/02* (2013.01); *H04L 67/306* (2013.01); *H04L 67/36* (2013.01)

(58) Field of Classification Search
CPC ......... G06F 17/30528; G06F 17/30327; G06F 17/30554; H04L 67/02; H04L 67/36; H04L 67/306
See application file for complete search history.

(56) References Cited

U.S. PATENT DOCUMENTS

| | | | | |
|---|---|---|---|---|
| 8,084,045 | B2* | 12/2011 | Pouliquen | A61K 9/0024 424/280.1 |
| 8,527,510 | B2* | 9/2013 | Chen | G06Q 10/1053 707/736 |
| 2010/0049534 | A1* | 2/2010 | Whitnah | G06Q 30/02 705/319 |
| 2013/0179449 | A1* | 7/2013 | Balcan | G06F 17/30867 707/737 |
| 2016/0191450 | A1* | 6/2016 | Lineberger | H04L 51/32 709/206 |

OTHER PUBLICATIONS

Brendel et al., Static and Dynamic Approach of Social Roles Identification Using PISNA and Subgraphs Matching, 2010 International Conference on Computational Aspects of Social Networks (CASoN), pp. 557-560 (Year: 2010).*

* cited by examiner

*Primary Examiner* — Greta L Robinson
(74) *Attorney, Agent, or Firm* — Schwegman Lundberg & Woessner, P.A.

(57) ABSTRACT

Systems and methods for improving search results using social routing are provided. In example embodiments, an affinity metric and match metric are determined for a plurality of users. The affinity metric indicates an interaction level between a given user and the match metric indicates how well the given user matches parameters of a search string. Based on a correlation between the affinity metric and the match metric, one or more items of content may be transmitted to one or more selected users. Improved search results can then be generated based on interactions with the one or more items of content.

20 Claims, 19 Drawing Sheets

HIGH-MATCH / HIGH-AFFINITY RESULTS

RESULTS FOR PROFILES WITH STRONG AFFINITY FOR CYBLU DATABASE PLATFORM

| | | |
|---|---|---|
| JOHN SMITH<br>SR. SOFTWARE ENGINEER<br>PALO ALTO, CA \| INTERNET | CURRENT:<br>PAST:<br>EDUCATION:<br>Category: | ACME PRODUCTS<br>MICROSOFT<br>U OF MICHIGAN<br>2 (HM/HA) |
| FRED FLIN<br>SR. SOFTWARE ENGINEER<br>SAN JOSE, CA \| INTERNET | CURRENT:<br>PAST:<br>EDUCATION:<br>Category: | GAMES R GREAT<br>ACME PRODUCTS<br>UTC COMMUNITY<br>2 (HM/HA) |
| SALLY ALLEN<br>SR. SOFTWARE ENGINEER<br>SAN MATEO, CA \| INTERNET | CURRENT:<br>PAST:<br>EDUCATION:<br>Category: | ZYNGA<br>ACME PRODUCTS<br>HARVARD<br>2 (HM/HA) |
| TED KIMBO<br>SR. SOFTWARE ENGINEER<br>PALO ALTO, CA \| INTERNET | CURRENT:<br>PAST:<br>EDUCATION:<br>Category: | STEALTH<br>ACME PRODUCTS<br>BERKELEY<br>2 (HM/HA) |
| ERIC TROTZKY<br>SR. SOFTWARE ENGINEER<br>SAN MATEO, CA \| INTERNET | CURRENT:<br>PAST:<br>EDUCATION:<br>Category: | ZYNGA<br>GOOGLE<br>YALE<br>2 (HM/HA) |

*FIG. 18*

SEARCH RESULTS USING SOCIAL ROUTING OF CONTENT

TECHNICAL FIELD

Embodiments of the present disclosure relate generally to search engines and, more particularly, but not by way of limitation, to improving search results using social graph data routing of content over networks.

BACKGROUND

In response to receiving a search string, search engines conventionally access stored data, locate data items that match the query parameters of the search string, and return the data items as search results. However, if the query parameters are too narrow, most potential search results will be filtered out and little to no results may be returned.

BRIEF DESCRIPTION OF THE DRAWINGS

Various ones of the appended drawings merely illustrate example embodiments of the present disclosure and should not be considered as limiting its scope.

FIG. 18 is an interface diagram illustrating search results generated from augmented network entity data points, according to an example embodiment.

DETAILED DESCRIPTION

Figure 1:
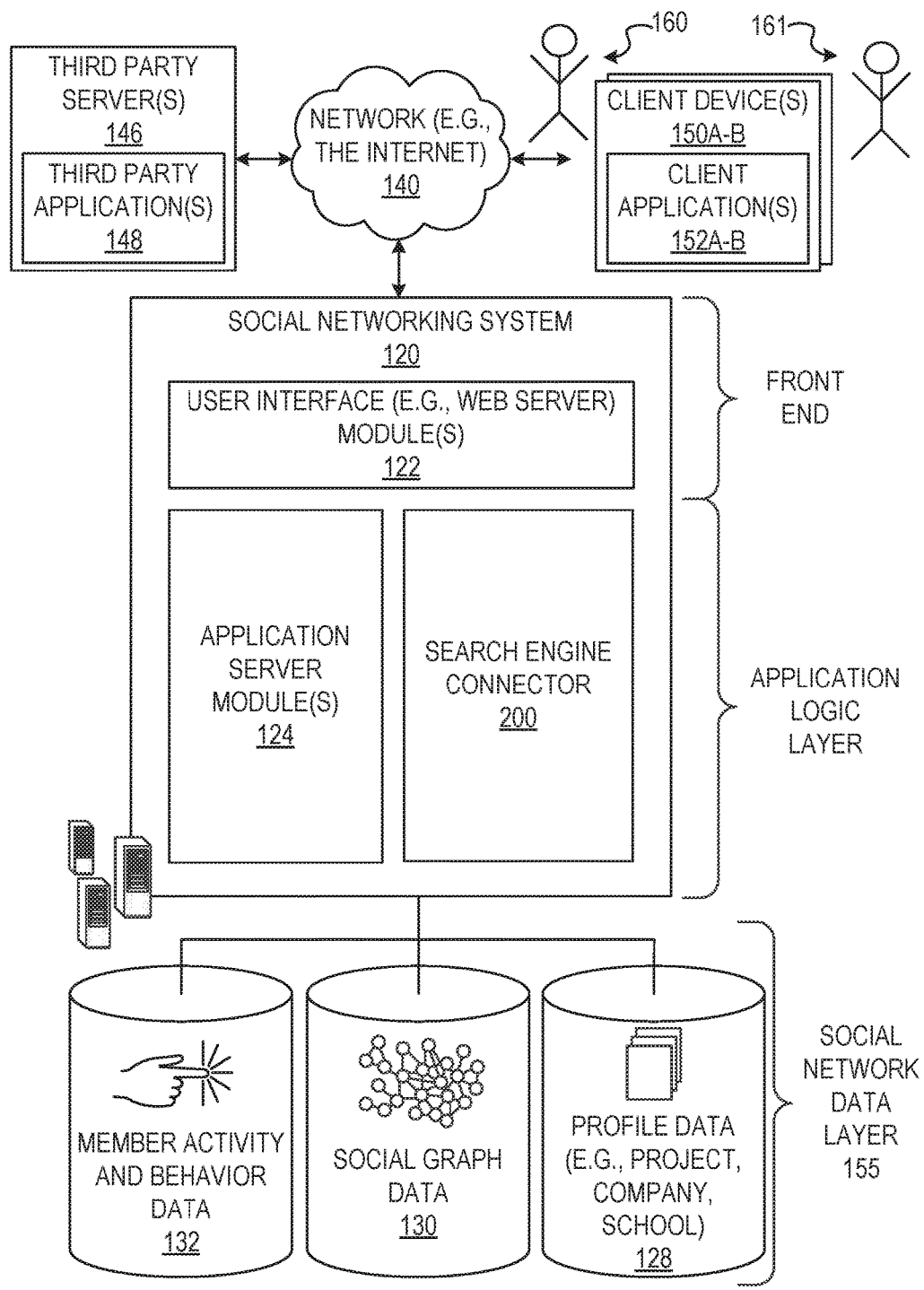
FIG. 1 is a block diagram illustrating various functional components of a social network platform, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

In various example embodiments, a search engine connector may receive search strings and actively improve search results through connecting user results with content and interaction data. In some embodiments, the search engine connector determines an affinity metric for a plurality of users. The affinity metric specifies how likely a given user is to respond to an electronic communication (e.g., email). The affinity metric may be determined using the amount of connections a given user has to members of the social network, keywords in the given user's member profile, or the given user's interaction level with content generated from social network. In some embodiments, the search engine connector determines a match metric for the plurality of users. The match metric specifies how well of a match a given user is for a search string using parameters of the search string. The search engine connector may route content to a portion of the plurality of users to increase user interaction and subsequent affinity levels for the users. The increases in interaction and affinity levels then increase the amount of results for a given search.

In some embodiments, the search engine connector receives the search strings and actively improve search results through assessment-based routing of content. The search engine connector may determine how many internal users (e.g., company employees) a given user has as a connection in a social graph of the social network. The search engine connector may further determine whether a given external user and given internal user share any further attributes (e.g., worked on the same project or type of project within a company). The search engine connector then generates an electronic assessment and sends the electronic assessment to the internal user. The electronic assessment comprises data or questions about the connection or shared attributes. The internal user completes the electronic assessment and transmits it to the search engine connector. The search engine connector then creates an electronic message that includes references or data from the electronic assessment (e.g., positive reviews). The electronic assessment is then transmitted to the user, who generates affinity and interaction data when assessment is opened or manipulated (e.g., links clicked, display objects requested from server). The search engine connector then generates updated search results that have more results (e.g., hits) in response to the social routing and the assessment routing operations.

As shown in FIG. 1, a social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the disclosed subject matter with unnecessary detail, various functional modules and engines that are not germane to conveying an understanding of the disclosed subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the disclosed subject matter is by no means limited to such an architecture.

As shown in FIG. 1, the front end layer consists of a user interface module(s) (e.g., a web server) 122, which receives requests from various client-computing devices including one or more client device(s) 150A-B, and communicates appropriate responses to the requesting device. For example, the user interface module(s) 122 may receive requests in the form of Hypertext Transport Protocol (HTTP) requests, or other web-based, Application Programming Interface (API) requests. Each of client device 150A and 150B may be used by respective users, such as user 160 and user 161. User 160 is referenced herein as an internal user or internal network entity, where the term "internal" specifies that user 160 is part of a social data structure associated with the social networking system 120. User 161 is referenced herein as an external user or external network entity, where the term "external" specifies that user 161 is part of a social data structure associated with social networking system 120. For example, if the social networking system 120 is a network-based system for a company or organization, then user 160 is an employee or associate of the company or organization whereas user 161 is then a person external to the company (e.g., not employed by the company). Different social network data structures may be managed to track the social network for internal users, external users, or both internal and external users. For example, the social graph data in database 130 may include a social graph for internal users, as well as a social graph for external users, with connections or "edges" of the social graph detailing how the internal users are connected to each other and/or to external users.

The client devices 150A-B may be executing respective web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150A may be executing client application(s) 152A. The client application(s) 152A and 152B may provide functionality to present information to user 160 and user 161, respectively, and further allow each to communicate via the network 140 to exchange information with the social networking system 120. Each of the client devices 150A-B may comprise a computing device that includes at least a display and communication capabilities with the network 140 to access the social networking system 120. The client devices 150A-B may respectively comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 160 and user 161 may be a person, a machine, or other means of interacting with the client device(s) 150A-B. The user 160 and user 161 may interact with the social networking system 120 via the client device(s) 150A-B. As discussed, the user 161 may not be part of the networked environment, but may be associated with client device(s) 150B.

As shown in FIG. 1, the data layer includes several databases, including for storing data for various entities of the social graph, including member profiles, company profiles, educational institution profiles, as well as information concerning various online or offline groups, as described in further detail below. Of course, with various alternative embodiments, any number of other entities might be included in the social graph, and as such, various other databases may be used to store data corresponding with other entities.

Consistent with some embodiments, when a person initially registers to become a member of the social networking system 120, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, project history (e.g., projects completed within any one or more of the organizations of the employment history), skills, professional organizations, interests, and so on. This information is stored, for example, as profile data in the database 128.

Once registered, a member may invite other members, or be invited by other members, to connect via the social networking system 120. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system 120. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content (e.g., webpages, hyperlinked portions of webpages, emails), and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, internal members of the social networking system 120 may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Members of other companies may be external members with respect to the internal members of a given company. Membership in a group, a subscription or following relationship with a company or group, as well as an employment relationship with a company, are all examples of different types of relationships that may exist between different entities, as defined by the social graph and modeled with social graph data in database 130. As discussed, the social graph data in database 130 may include subsets organized by internal and external members or users. For example, a plurality of internal users (e.g., user 160 and other internal users) may be grouped in one internal social graph subset, while a plurality of external users (e.g., user 161 and other external users) may be grouped in another external social graph subset.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120.

In some embodiments application server module(s) 124 includes a publishing module for publishing items of content, such as blog posts, status updates (e.g., tweets), and emails. Further, application server module(s) 124 may include a messaging application, such as an email application, an instant messaging application, or some hybrid or variation of the two. A photo sharing application may be implemented with one or more application server module 124. Similarly, a search engine enabling users to search for and browse member profiles may be implemented with one or more application server module 124. Though, as described with reference to FIG. 2, a search engine may be included in place of or in addition to a search engine in application server module 124. Of course, other applications and services may be separately embodied in their own application server modules 124. As illustrated in FIG. 1, social networking system 120 may include a search engine connector 200, which is described in more detail below.

Additionally, a third party application(s) 148, executing on a third party server(s) 146, is shown as being communicatively coupled to the social networking system 120 and the client device(s) 150A-B. The third party server(s) 146 may support one or more features or functions on a website hosted by the third party.

Figure 2:
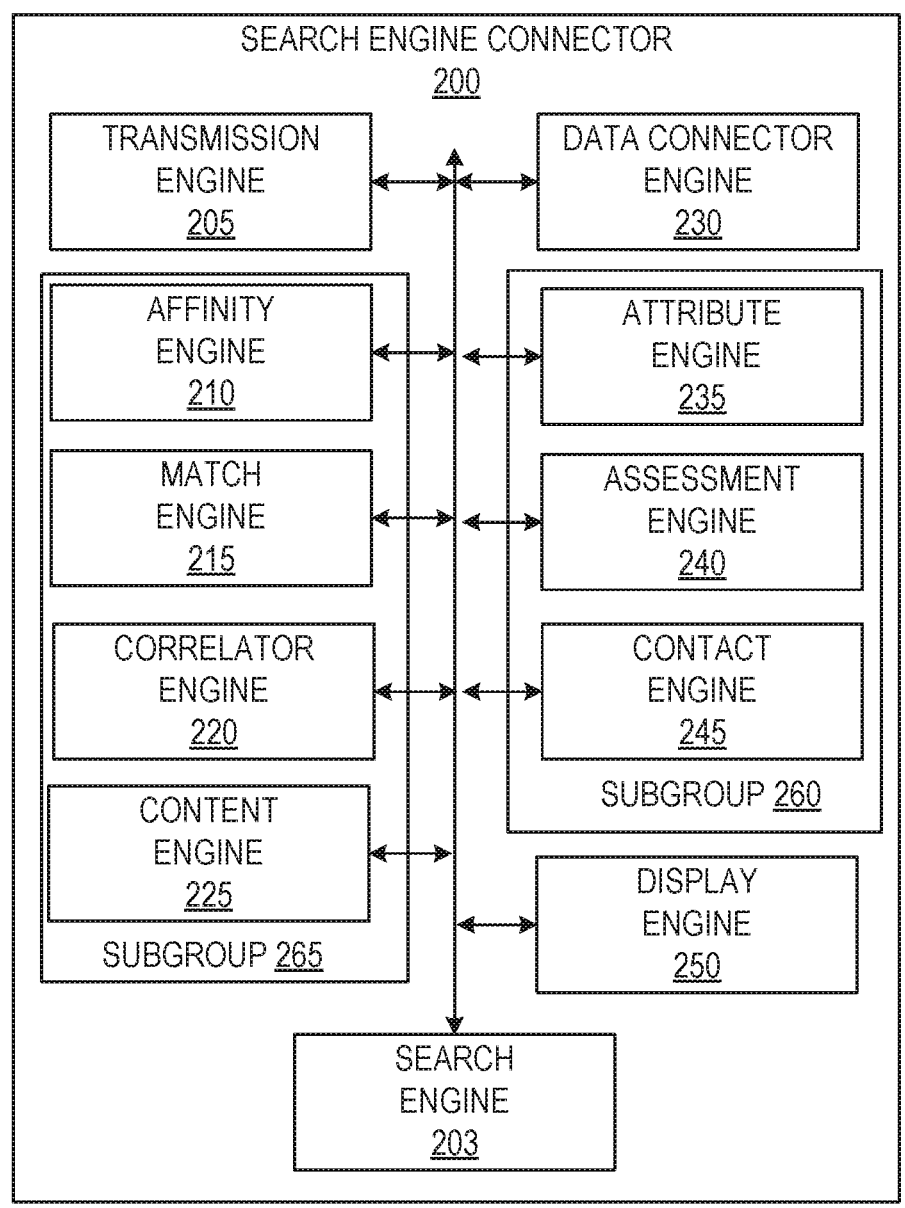
FIG. 2 is a block diagram illustrating various functional modules that form a workplace collaboration application, which is provided as part of the social network platform, according to an example embodiment.

FIG. 2 illustrates a block diagram showing components provided within the search engine connector 200, according to some embodiments. The following components of the search engine connector 200 can in some embodiments be hosted on a single host machine (e.g., a single server executing engines from local memory); though, in some embodiments the following components can also be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) in a database layer, e.g., social network data layer 155.

To this end, as illustrated, the search engine connector 200 comprises a search engine 203, transmission engine 205, an affinity engine 210, a match engine 215, a correlator engine 220, a content engine 225, a data connector engine 230, an attribute engine 235, an assessment engine 240, a contact engine 245, and a display engine 250. In one embodiment, engines 203-205 are written in a computer-programming and/or scripting language. Examples of such languages include, but are not limited to, C, C++, C#, Java, JavaScript, Perl, Python, or any other computer programming and/or scripting language now known or later developed.

One or more of the components may be organized into subgroups, such as a social routing subgroup 265 that comprises the affinity engine 210, the match engine 215, the correlator engine 220, and the content engine 225. Collectively, the routing subgroup 265 is responsible for determining an affinity for external entities, determining a match metric for those external entities, determining a correlation between the affinity metric and the match metric for each of the external entities (determining a first correlation for a first external user, determining a second correlation for a second external user), and providing content to a portion of the external entities based on the affinity metric being lower than the match metric by a predetermined amount as according to some embodiments.

The assessment routing subgroup 260 comprises the attribute engine 235, assessment engine 240, and contact engine 245. The assessment routing subgroup 260 is responsible for accessing internal network entity datasets (e.g., profile data for internal users), accessing external network entity datasets (e.g., profile data for external users), determining a correlation between the internal network entity datasets and the external network entity datasets, generating assessments for the internal users, receiving assessment results from the internal users, and generating electronic messages for the external users where the electronic messages comprise data from the assessment results.

The social routing subgroup 265 and the assessment routing subgroup 260 are capable of improving search results by updating social graph data responsive to the routing of content and messages to the external users.

One or more of the engines in search engine connector 200 may be used by both subgroup 265 and subgroup 260. For example, the search engine 203, the transmission engine 205, the data connector engine 230, and the display engine 250 may both be used by each of the subgroups 260 and 265 to connect to other components within the network environment, connect to the social network data layer 155 or generate displays, for example using the display engine 250.

Search engine 203 is configured to receive search strings from a user (e.g., user 161) that is searching for user profiles that have certain parameters or qualifications (e.g., skills, past work experience, past project experience, numerical duration of time for the skill, numerical duration of time for the past work experience, a certain educational background). The search engine 203 may receive search string inputs through one or more entry fields, selection elements (e.g., checkboxes), and filters that further limit or specify the parameters of a search.

Transmission engine 205 is configured for interfacing with the other components of social networking system 120, third party servers 146, or client devices 150A-B, for example, through one or more application programming interfaces (APIs).

The affinity engine 210 is configured to determine affinity metrics for the external users. As discussed above, in some embodiments, an external user (e.g., user 161) may use client device (e.g., client device 150B) to interface with networking system 120 and generate profile data, which may include data specifying the past project experience, past work experience, company experience, education or other qualifications parameters.

Each of the user profiles in the database 128 may be tracked using an identifier. In some embodiments, the identifier may be used to access social graph data in database 130 to determine how many communications the user has triggered with the social networking system 120. For example, some communications or connections may include reading a blog or viewing a blog of the social networking system 120 (e.g., published by the publishing module in application server module(s) 124).

In some embodiments, an affinity metric may be determined by an overlap between the external user and internal users of social networking system 120, where an overlap is how many connections the external user has to internal users. Further, as according to some embodiments, the affinity engine 210 may determine how many electronic messages or emails the external user has received in the past and further determine whether the external user has responded to any of the past emails. In some embodiments, the affinity metric is inversely proportional to the amount of emails the external user receives. For instance, if the user is inundated with emails, he or she may be less likely to respond to an email, and thusly will have a lower affinity for the social networking system 120 overall.

The match engine 215 is configured to determine match metrics for external users. Generally, a match metric specifies how well a given external user matches the parameters of a search string entered by an internal user. How well the given external user matches the parameters may be determined from the profile parameters or data from a user's profile which is stored in the database 128. For example, if an internal user generates a search for database engineers that have approximately five years of experience with No-SQL databases, one or more external users may be returned as results if they have five or more years of experience with No-SQL databases. The external users that have more than five years of relevant experience may have higher match metrics, while the external users that have less than five years of relevant experience will have lower respective match metrics or not be returned as results (e.g., threshold cutoff of five years experience in a given field).

As a further example, the match engine 215 may access profile data for different external users and filter out users that do not match search parameters or profile parameters, for example, by filtering out all users without an specific academic degree.

The correlator engine 220 is responsible for determining a correlation between the affinity metric and the match metric for the plurality of external users. In some embodiments, the correlator engine 220 may use a predetermined ratio between the affinity metric and the match metric to determine which users should receive content items. Depending on the affinity metric-to-match metric ratio for a given external user, the external user may receive passive or active content. In this regard, passive content is content integrated into webpages displayed to the given external user whereas active content includes direct communications sent to the external user. In some embodiments, the external users that have an affinity metric that is lower than their respective match metric are selected to receive passive content, such as display of links to blog posts, or active content, such as emails.

The content engine 225 is configured to select content or generate content for transmission to any selected external users, as selected by the correlator engine 220. In some embodiments, the content engine 225 may be configured to directly email the selected users with information about the social networking system 120 or upcoming events for the social networking system 120.

The data connector engine 230 is a database interface that is configured to connect to a social network data layer 155. As discussed above, social network data layer 155 may comprise data in different data structures that use different database engines to access. For example, the social graph data may be stored in a NoSQL format, whereas the profile data may be stored in a relational database system. The data connector engine 230 includes the functionality to interface with the social graph data in a NoSQL format and also connect with the profile data, which is in the relational database format.

The attribute engine 235 determines attributes for internal users or external users, for example, by determining whether any of the internal users have the same attributes as any of the external users. An attribute for a user can include a past company or project with which the given user was associated (e.g., employed). An internal user may share an attribute with an external user, for example, if they worked for the same company in the past, worked on the same project in the past, or are otherwise affiliated by being part of the same member group, as detailed by group member data in the database 128.

The attribute engine 235 is configured to determine a correlation between internal users and the external users based on connections made in a social graph data. For example, for a given internal user, the attribute engine 235 may use the social graph data to determine how many connections the given internal user has to external users. The attribute engine 235 is further configured in some embodiments to restrict or limit the correlation using shared attributes; that is, an attribute common to the internal user and the external user, such as a shared company. The attribute engine 235 is further configured in some embodiments to restrict or limit the correlation using specified attribute per entity; that is, a first attribute for the internal user is a first specified type (e.g., manager of a given project) and a second attribute for the external user is a second specified attribute type (e.g., subordinate involved in the given project.

For example, the attribute engine 235 can identify that a given internal user worked on a given project, e.g., a first attribute, within a given company, e.g., a second attribute, and further determine that an external user also worked on the given project within the given company during the same time span. In this example, the social graph data shows that the internal user and external user are connected, thus creating a correlation, and the correlation is further restricted by specifying a first attribute and second attribute. In this approach, the correlation may be determined from the social graph in database 130 and profile data in the database 128 for each of the internal user and external user, which may be accessed to determine that the internal and external users share first and second attributes.

Further, in some embodiments, the attribute engine 235 may specify a relationship between different attributes for the internal user and external user as a restriction limit. For example, the attribute engine 235 may specify that the internal user have a position or title that is higher than the external entity, where the internal and external entities both have a shared project or shared company experience. The relationship between different attributes may be implemented, for example, to find internal users that were past managers or bosses of a given external user.

The assessment engine 240 is configured to generate an electronic assessment using data from the attribute engine 235. For example, the attribute engine 235 may identify which internal users correspond to which external users using one or more restrictions (e.g., identifying a correlation using social graph data, then restricting the correlation by specifying shared attributes). The identified one or more internal users may be transferred to the assessment engine 240. The assessment engine 240 may determine or may generate an electronic assessment using the shared attributes that were identified. For example, the assessment may have one or more data fields that are populated using the shared attributes between the internal and external entities, as is described in further detail below with reference to FIG. 12.

After generating the electronic assessment, the assessment engine 240 may transfer or transmit the electronic assessment to the transmission engine 205, which may transmit the electronic assessment to client devices, such as client device 150A. The assessment engine 240 may also receive assessment results from the client devices. The electronic assessment may include one or more input elements or objects that are customized per attributes. An internal user, such as user 160, may input data using the input elements as displayed on client device 150A, for example.

The contact engine 245 is configured to receive the assessment results and generate one or more electronic messages to be dispatched to the external network user (e.g., user 161), as is described or as is shown in further detail below with reference to FIG. 14. The one or more electronic messages may comprise data from the electronic assessment results, as input by an internal user, such as user 160. The contact engine 245 may transmit the electronic messages to client devices, such as client device 150B.

The display engine 250 is configured to construct user interface display elements for the other engines in the search engine connector 200. For example, in some embodiments the display engine 250 is configured to generate passive content items for integration into a webpage being viewed by a client device. The passive content may be published within the application server module(s) 124, and the display engine 250 may create a banner or portion of a webpage that network links to the passive content. The portion of a webpage may, for example, be displayed on webpages generated by the social networking system 120 or webpages hosted by third party server(s) 146.

Further, in some embodiments, the display engine 250 may be configured to generate user interfaces for the electronic message and/or the electronic assessment. Further, in some embodiments, the display engine 250 is configured to generate an administrative interface from which internal users can select one or more external network entity data points to be contacted using passive content emails or electronic messages that reference assessment results, such as the administrative interface illustrated in FIG. 7.

Figure 3:
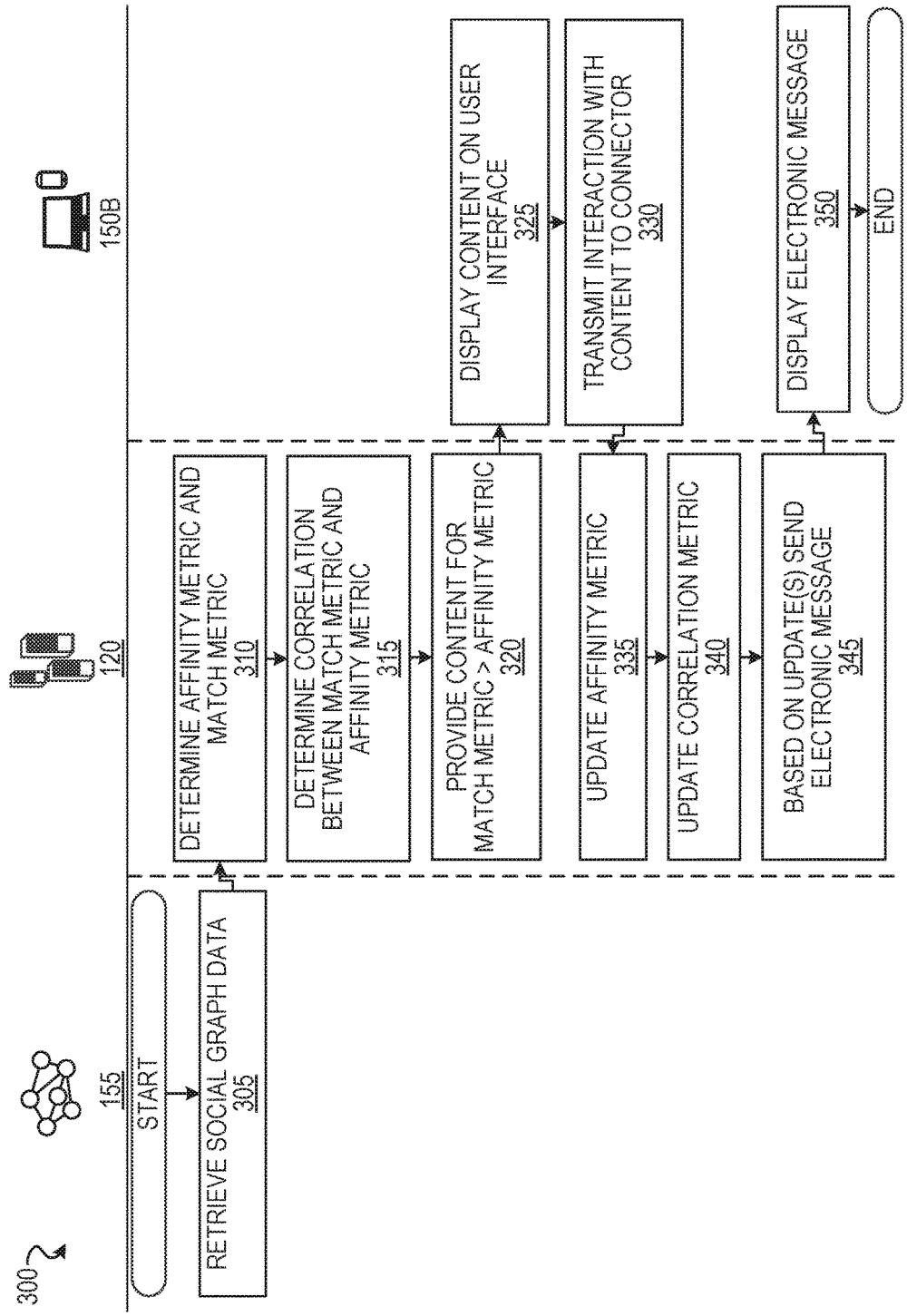
FIG. 3 is a swim-lane diagram illustrating interactions between network components to perform social routing of content, according to an example embodiment.

FIG. 3 is a swim-lane diagram 300 illustrating interactions between network components (social network data layer 155, social networking system 120, and client device 150B) to perform social routing of content, according to an example embodiment. At operation 305, social graph data is retrieved from the social network data layer 155. The social network data retrieved may include member activity data from the database 132, social graph data from the database 130, and profile data from the database 128. At operation 310 the affinity metric and the match metric are determined by the social networking system 120, as is explained in further detail below with reference to FIGS. 4 and 5.

At operation 315 the correlation between the match metric and the affinity metric is determined. For example, for a given external user, the search engine connector 200 may determine ratio between the user's affinity metric and the user's match metric.

At operation 320, content is provided for users that have an affinity metric that is lower than their respective match metric. In some embodiments, the search engine connector 200 partitions the users into four categories: (1) high-match/low-affinity, (2) high-match/high-affinity, (3) low-match/high-affinity, and (4) low-match/low-affinity. However, the four foregoing categories are merely illustrative and additional or different categories are also possible.

Each of the categories specifies a correlation between a match value and an affinity value for users in each respective category. As explained in further detail below, in some embodiments, content is routed to users that correspond to a high-match/low-affinity correlation (e.g., category 1 correlation).

The foregoing categories generally correspond to different types of user profiles. For example, category 1 may correspond to an external user profile whose profile data meets or exceeds the requested parameters, but does not have an interest or is unaware of the social networking system 120 or company associated with the social networking system 120 (e.g., exhibits low affinity). Category 2 may correspond to an external user profile whose profile data meets or exceeds the requested parameters and has high interest in the networking system 120 or associated company, as evidenced for example by having a high number of social network connections to internal users, subscribing to blogs of the social networking system 120, high rates of email opens of emails sent from the social networking system 120 or associated company, or high click/view rate of passive content (e.g., blogs, tweets) generated by the social networking system 120 or associated company. Category 3 may correspond to a user profile whose profile parameters do not meet the specified parameters (e.g., an applicant unqualified for a specific job) but the user still has a high interest in the social networking system 120 or associated company. Category 4 may correspond to an external user having profile parameters that do not match the specified parameters (e.g., low match), and who also does not have an affinity for the social networking system 120 or associated company.

In at least one embodiment, the users in the high-match/low-affinity are selected by the search engine connector 200 to receive passive content or active communications (e.g., direct emails). The content may be transferred, or transmitted, to one or more client devices, such as client device 150B, at operation 325, in which client device 150B displays content on its user interface (e.g., display screen).

The displayed content may have one or more network links (e.g., hyperlinks), input controls (e.g., form fields, drop boxes, text entry fields, slider controls) that allow interaction with the content.

At operation 330, the client device 150B transmits the data generated by the interaction with the displayed content to the search engine connector 200. In at least one embodiment, viewing the content qualifies as an interaction with the content. For example, when the client device 150B tries to display the content, the content may initiate retrieval of one or more user interface elements (e.g., text, images) from social networking system 120 for display. In at least one embodiment, an interaction is detected when the user, such as user 161, clicks on a link in the content and is served a page or data from the social networking system 120.

At operation 335 the affinity metric may be updated, by for example, updating the member activity and behavior data (in the database 132) with the recent interaction data that occurred on the client device 150B, and then recalculating the affinity metric.

At operation 340, the correlation metric is updated with the affinity metric data. At operation 345, if the correlation metric indicates that the external user has transitioned to a different category (e.g., from category 1 to category 2), an electronic message may be generated. At operation 350, the electronic message is received by, and displayed on, the client device 150B.

Figure 4:
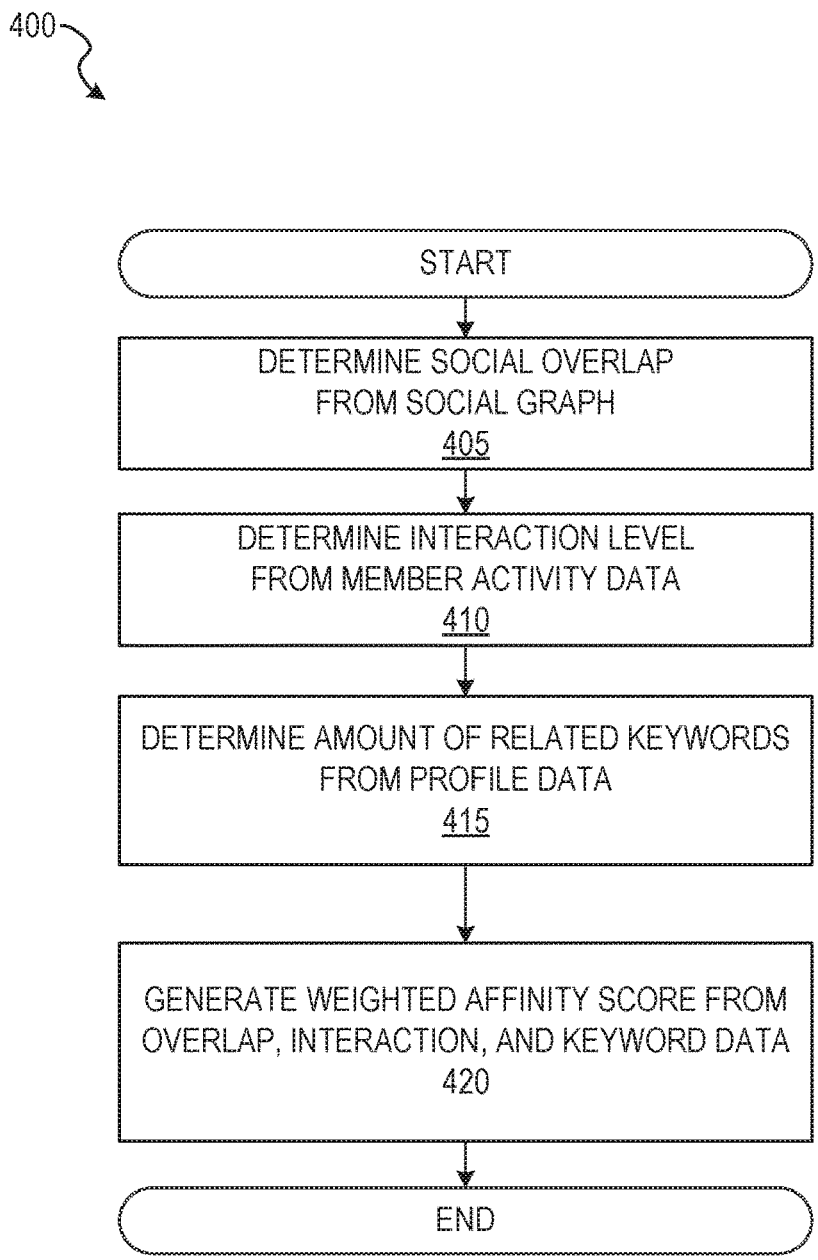
FIG. 4 is a flow diagram illustrating an example method for generating affinity metric data, according to an example embodiment.

FIG. 4 is a flow diagram illustrating an example method 400 for generating affinity metric data, according to an example embodiment. At operation 405, the data connector engine 230 accesses social graph data, such as from the database 130, for analysis. The affinity engine 210 may analyze the social graph data to determine the social overlap between a given user, and users of the social networking system 120. For example, if the user is an external user, and the users of the social networking system 120 are internal, the affinity engine 210 may use the social graph data to determine how many connections the external user has to internal users.

At operation 410, the affinity engine 210 may access the member activity and behavior data to determine an interaction level. The interaction level indicates how many times in the past a given external user has viewed/read blogs from the social networking system 120, clicked on posts from the social networking system 120, shared posts of the social networking system 120, or sent electronic messages to the social networking system 120 (e.g., email response to emails sent from the social networking system 120 to the external user).

At operation 415, affinity engine 210 may access profile data to determine how congruent the given external user's profile data is to the social networking system 120. In some embodiments, the level of congruence is determined by comparing keywords that can be used to describe the social networking system 120 (or describe a company associated with the social networking system 120), determining whether any of the descriptive keywords appear as keywords in the profile data of the given external user. For example, if the social networking system 120 is database-oriented (e.g., the social networking system 120 defines a social network of database developers and administrators), operation 415 may determine how many database-related keywords appear within the external user's profile data.

At operation 420, the affinity engine 210 generates an affinity metric from the overlap data generated at operation 405, the interaction level data generated at operation 410, and the keyword congruence data generated at operation 415. In some embodiments, each of the data from operations 405, 410, and 415 may be weighted, such that when combined they add up to a total possible score of 100. For example, in some embodiments, the social overlap data may account for 30 possible points, the interaction level data may account for 50 possible points, and the keyword congruence data may account for 20 points. Within each possible weighting, thresholds may be set for the user to qualify for different point levels. For example, to receive 45 of the 50 interaction level points, an external user may be required to read or view content from the social networking system 120 at least twice a week. In some embodiments, the interaction levels for all identified external users is identified and the user with the highest interaction level is set at the limit (e.g., 50 points) and the other external users may be normalized by normalizing over a range, averaging, or other statistical methods, such as setting a curved distribution.

In this way, the fact that a user is interacting with the content from the social networking system 120 is more heavily weighted while still maintaining weighted inputs from the social overlap and keyword congruence. In some embodiments, an internal user performing a search may more heavily weigh social overlap data than interaction level data (e.g., social overlap data may be out of 50 possible points and interaction level data may be out of 10 possible points). This may be preferable, for example, where the social networking system 120 or company associated with the social networking system 120 prefers external users that have a high number of references or connections with the internal users of the social networking system 120.

Figure 5:
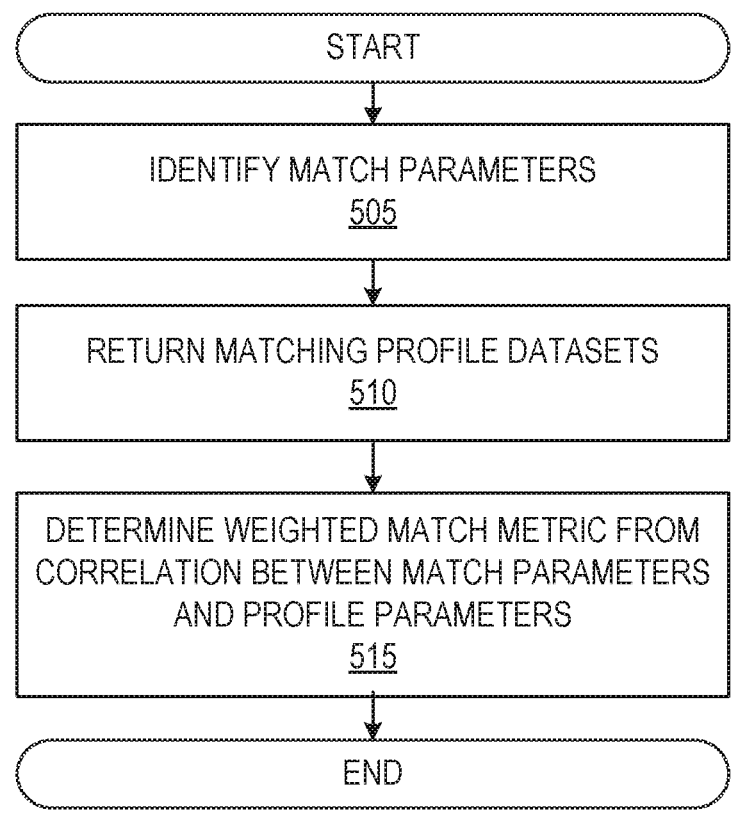
FIG. 5 is a flow diagram illustrating an example method for generating match metric data, according to an example embodiment.

FIG. 5 is a flow diagram 500 illustrating an example method for generating match metric data, according to an example embodiment. At operation 505 the match engine 215 identifies match parameters for an entered search string. The match parameters are the desired characteristics or attributes of an external user. For example, a user (e.g., internal user 160) may use a search engine within application server module(s) 124 to search for potential job candidates. The user may enter a search string (e.g., text input, checkbox selection of categories) through an interface generated by user interface module(s) 122. The search string specifies match parameters, which are requirements that a potential job candidate must have to be returned as a search result. For instance, the user may enter a search string specifying match parameters including: database engineers (e.g., match parameter=database engineer) having an experience value of five years (e.g., match parameter=five years of database engineering experience).

At operation 510, the match engine 215 receives profile data through the data connector engine 230. In some embodiments, the match engine 215 passes the match parameters to the data connector engine 230 and the data connector engine 230 uses the received match parameters to formulate a query for database 128. The parameters specifying a given external user's characteristics or attributes are profile parameters. In at least one embodiment, the data connector engine 230 accesses database 128 and returns profile datasets that have profile match parameters that meet or exceed the specified match parameters. For example, if a first profile dataset comprises profile parameters including a database engineer having five years of database engineering experience and a second profile dataset comprises profile parameters including a database engineer having 23 years of database engineering experience, both the first profile dataset and the second profile dataset may be returned as meeting or exceeding the example match parameters specified above. Further, in at least one embodiment, all profile datasets that have profile parameters that approximately meet the requirements of the match parameters are also returned. For example, a third profile dataset having profile parameters including database engineering experience of six months may also be returned as a result. In this way, more profile datasets are returned as results, which can then be categorized into the one of four categories described above. This allows a searching user to select user results that do not meet the match parameters but nonetheless are acceptable.

Though a type of job (e.g., database engineering) and duration of time (e.g., five years) is used here as an example, one of ordinary skill in the art will appreciate that other match parameters may be specified in the search string to customize a search and corresponding search results. Examples of match parameters and corresponding profile parameters include: past work or project experience, past companies/organizations, and education, institutions, and schools for that given user.

At operation 515, the match engine 215 determines a match metric from the correlation between the match parameters specified in the search string and the profile parameters identified in a profile dataset for a given user. The correlation specifies how given returned profile sets correspond to a match metric. For example, if a user has five years of experience, that user may have a correlation that indicates he/she (e.g., his/her profile dataset) meets the specified match parameter; whereas for example, if a user has 23 experience, that user has a correlation that indicates he/she (e.g., his/her profile dataset) readily exceeds the specified match parameters.

In some embodiments, a match metric is measured out of 200, and each match parameter is given a total possible value less than 200, such that when all match parameter values are added together they can add up to a maximum 200 points. For example, the first match parameter of five years of database experience may be assigned 100 points, a second match parameter of having a four year degree in computer science may be assigned 60 points, and a third match parameter of being located within 50 miles of a physical location (e.g., company headquarters) is assigned 40 points. Within each match parameter, a distribution may be implemented. For example, if a user has five years of database experience, that user may receive 80 points in the corresponding match parameter, and users that have more than five years of experience may receive increasing amounts of points from 80 to 100. In some embodiments, the match parameter values are granted in an all-or-nothing binary fashion. That is, for example, if a user has a four year computer science degree, the corresponding match parameter value is 60 points; whereas if the user does not have a four year science degree, the corresponding match parameter value is 0 points.

As discussed, each match parameter value may be combined (e.g., added, multiplied) to yield 200 possible points. For instance, if a user has 7 years of database experience, has a four year computer science degree and lives 15 miles away from the specified location, that user may receive 87 points (experience match parameter value over a distribution), 60 points (education match parameter, binary distribution), 40 points (distance match parameter, binary distribution), to receive a total match metric of 187.

Figure 6:
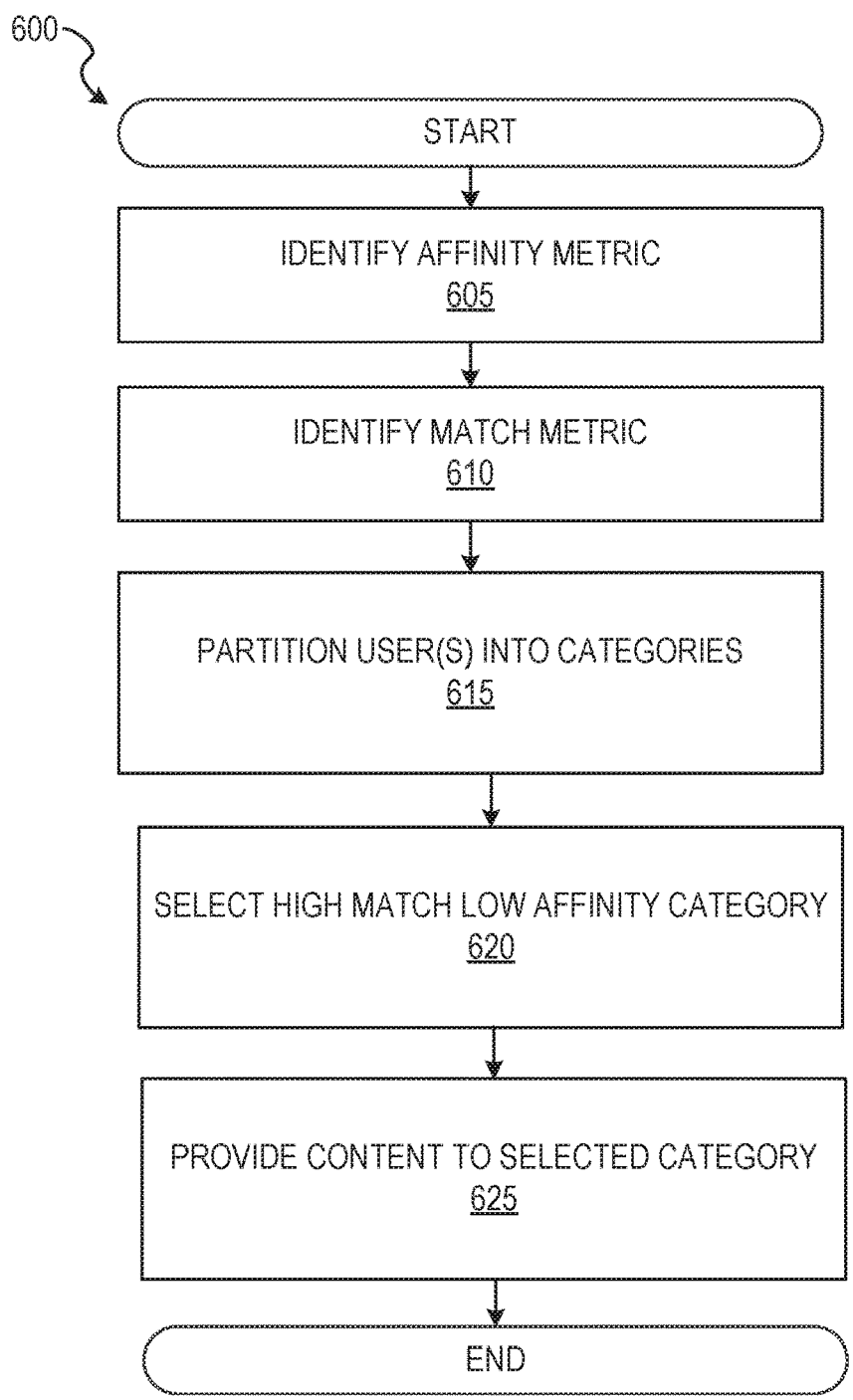
FIG. 6 is a flow diagram illustrating an example method for routing content, according to an example embodiment.

FIG. 6 shows a flow chart for a method 600 for determining routing correlation as according to some embodiments. At operation 605, the correlator engine 220 identifies the affinity metric. The affinity metric may be received from the affinity engine 210 as an output of the method 400 discussed with reference to FIG. 4 above. At operation 610, the correlator engine 220 may identify a match metric. The match metric may be received from the match engine 215 as an output of the method 500 discussed with reference to FIG. 5 above.

At operation 615, the correlator engine 220 may partition users into different categories that have different correlations, such as the four categories discussed previously. For example, the correlator engine 220 may use the affinity metrics and match metrics for respective users to assign the users (e.g., assign identifiers for the users) in two dimensions, e.g., along an affinity axis/dimension and a match axis/dimension, as shown in further detail below with reference to FIG. 7.

At operation 620, the correlator engine 220 selects the high-match/low-affinity category of users. In some embodiments, the correlation of the high-match/low-affinity category is a user that has a match metric of 100 or more (out of 200) and an affinity metric of 50 or less (out of 100). In some embodiments, a manual administrator may select the high-match/low-affinity categories using a user interface, as is shown in FIG. 7, to manually select all of the users in a given category, add users to a given category, or remove users from a given category.

At operation 625, the content engine 225 provides content to the selected category of users. The content engine 225 may, in some embodiments, send portions of content directly to the selected users. For example, the content engine 225 may send content to the selected users for display within pages of the social network after the users log-in to the social networking system 120; or, for example, the content engine 225 may send content to the selected users directly through an email messaging channel of the social networking system 120. Further, in some embodiments, the content engine 225 may interface with a content network (e.g., blog network, ad network) so that the users can be identified on third party servers 146, e.g., via tracking cookies, and be served content within pages served from the third party servers 146.

Figure 7:
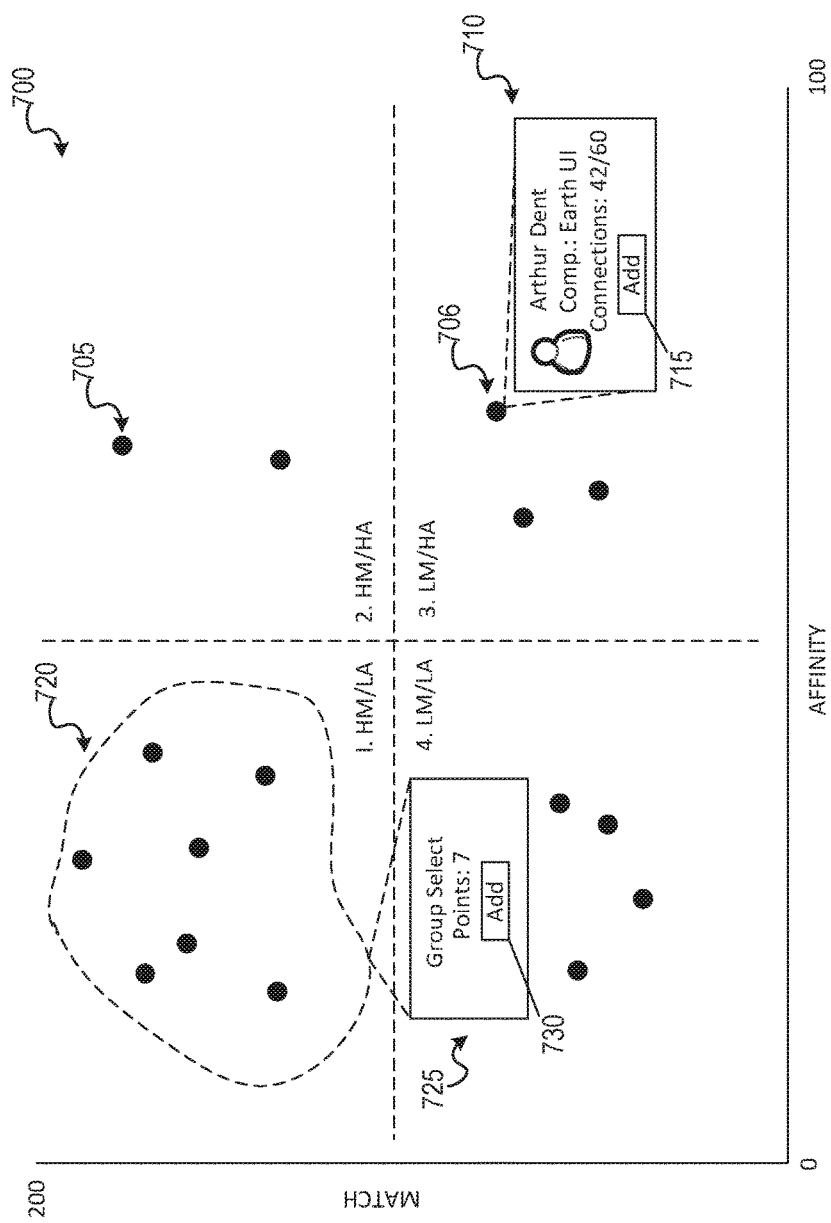
FIG. 7 is an interface diagram illustrating network entity data points, selection controls, and menu elements, according to an example embodiment.

FIG. 7 is a user interface 700 illustrating users represented as user data points, selection controls, and menu elements, according to an example embodiment. The user interface 700 may be generated by user interface module(s) 122 responsive to a search string entered by a user, such as internal user 160. Each user data point within FIG. 7 is illustrated as a black circle, such as external user data point 705. One of ordinary skill in the art will appreciate that other shapes and visual elements may also be used to represent user data points.

The operation 615 (FIG. 6) may partition the user data points into the four categories as explained above. As shown in FIG. 7, categories are illustrated as four sections of a vertical/horizontal axis graph. As illustrated, the vertical axis is a match metric axis having a range from 0 to 200, and the horizontal axis is an affinity metric axis having a domain from 0 to 100. Category 1 is illustrated in the top-left section of the graph, category 2 is illustrated in the top-right section of the graph, category 3 is illustrated in the bottom-right section of the graph, and category 4 is illustrated in the bottom-left section of the graph.

The user interface 700 comprises active control objects that enable actions such as drag-to-select. For example, a user may drag to select group 720, and responsive to the selection a pop-up menu 725 may be displayed within the user interface 700. The pop-up menu 725 comprises data about the user entity points selected, and an add button 730 that selects the user points in the selected group 720 as users to route content via content engine 225 to improve affinity scores of the selected users and improve subsequent search results.

In some embodiments, as illustrated, each of the user points may have its own pop-up menu that the active control objects generate responsive to a selection of the user point. For example, if a user clicks or otherwise selects user point 706, the active control objects generate pop-up menu 710, which displays information detailing user information and options for the user point 706. For example, as illustrated in pop-up menu 710, user point 706 corresponds to Arthur Dent, who works for the Earth UI. Other information for the user point 706 may be displayed, such as displaying that Arthur Dent has 42 connections to internal users (e.g., is connected to 42 internal users of social networking system 120).

Pop-up menu 710 further comprises an add button 715 that an internal user may use to add user point 706 to the selected group 720, even though point 706 does not meet the match requirement as it is low match and not in Category 1. In some embodiments, the correlator engine 220 automatically selects users in Category 1 to route content to via content engine 225.

Figure 8:
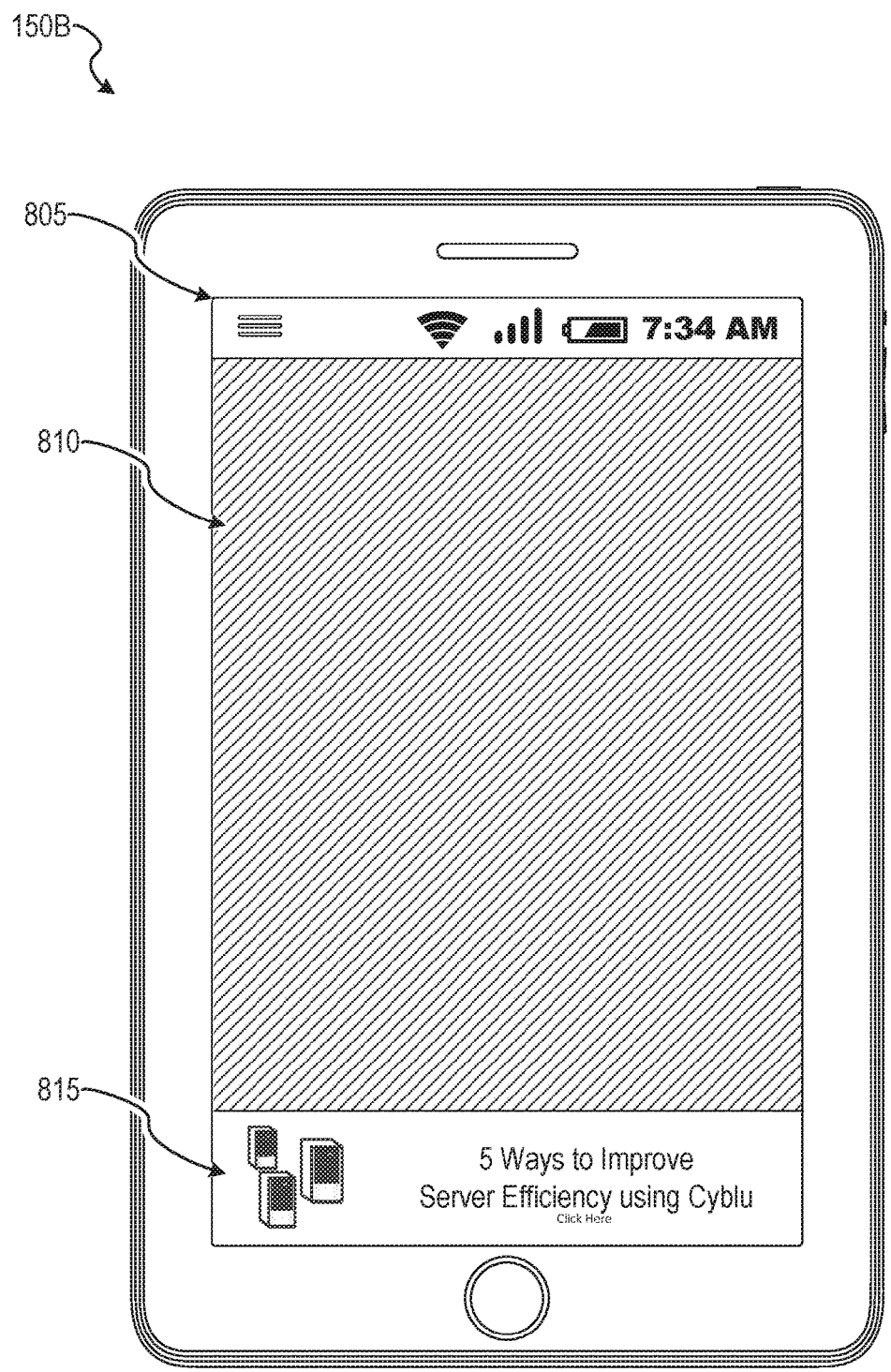
FIG. 8 is a client device having a user interface with content displayed, according to an example embodiment.

FIG. 8 illustrates a client device 150B of external user 161. Client device 150B may run applications viewable from a user interface or display screen 805. The display screen 805 may display web pages or applications being run by the external user 161 on client device 150B. For example, the primary application area 810 may be an external facing user interface for the social networking system 120 (e.g., as opposed to for example, an internally facing search interface where internal user 160 can input a search string). Further, in some embodiments, the primary application area 810 may be a webpage of a third party server 146. In some embodiments, routed content can be displayed as an overlay, as illustrated by item of content 815. Further, in some embodiments, a routed item of content 815 may be generated as a portion or panel of the primary application area 810 (e.g., banner, frame).

FIGS. 9-14 disclose an approach for modifying affinity metrics for users through assessment based routing, as according to some embodiments.

Figure 9:
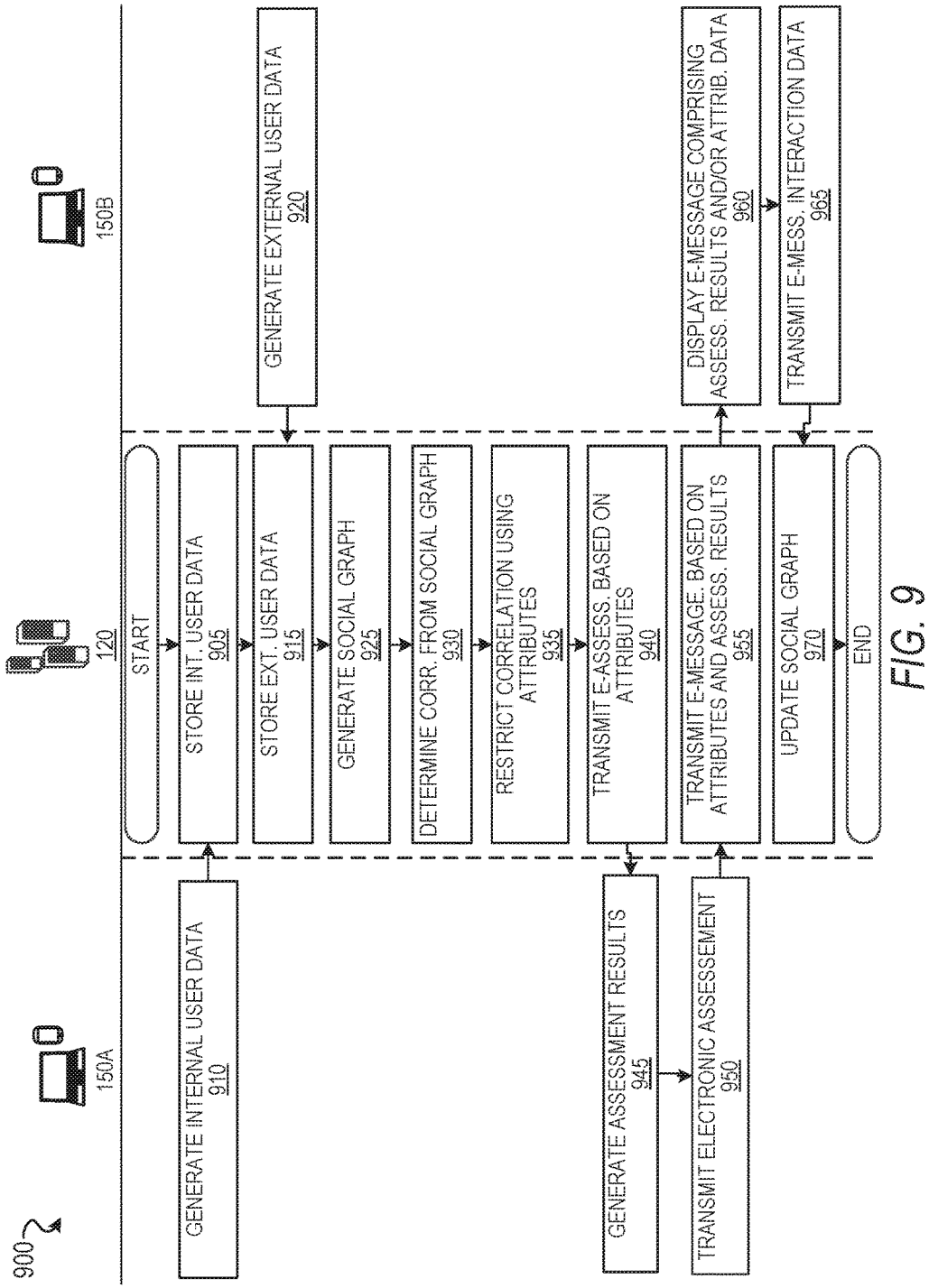
FIG. 9 is a swim-lane diagram illustrating interactions between network components to perform assessment routing of content, according to an example embodiment.

FIG. 9 is a swim-lane diagram 900 illustrating interactions between network components to perform assessment routing of content, according to an example embodiment. At operation 905, the social networking system 120 may store internal user data that is generated by client device 150A (e.g., user 160 entering, via client device 150A, profile parameters for his/her profile on social networking system 120). At operation 915, the social networking system 120 may store external user data that is generated by client device 150B (e.g., user 161 entering, via client device 150B, profile parameters for his/her profile on social networking system 120). The data received during operations 905 and 915 are collectively stored as profile data in database 128.

At operation 925, social graph data may be retrieved by data connector engine 230 from database 130. At operation 930, a correlation between the internal users and the external users is determined using the social graph data. The correlation is determined for each of the external users and specifies how many internal users a given external user has a connection with (e.g., an overlap between a given external user and the collective users of the internal social graph subgroup). At operation 935, the correlations may be restricted using attributes. For example, a given internal user may be connected to 120 internal users (e.g., 120 as an initial correlation); however, the internal user may have only worked with seven of the 120 internal users at the same company (e.g., seven internal users as the correlation restricted by a shared attribute of working for the same company). The correlation may be further restricted by specifying additional required attributes, such as the same department within the same company.

At operation 940, an electronic assessment based on the connection correlation or the attributes is generated and transmitted to the internal user 160 on client device 150A. The electronic assessment may include questions concerning the connected external user 161. At operation 945, the internal user 160 operating client device 150A interacts with the electronic assessment to generate assessment results. At operation 950, the client device 150A transmits the electronic assessment to the assessment engine 240. At operation 955, an electronic message based on the attributes and the assessment results is generated. For example, the email message may comprise references to the shared attributes, e.g., shared project, shared company, shared department within the company.

At operation 960, a client device 150B displays the received electronic message that comprises the references to the attributes and assessment results. At operation 965, an external user may interact with the electronic message. For example, the external user 161 may respond to the electronic message or select/click a link within the electronic message to produce interaction data. At operation 970, the interaction data is used to update the member activity behavior data in database 132, which in turn modifies the affinity data.

Figure 10:
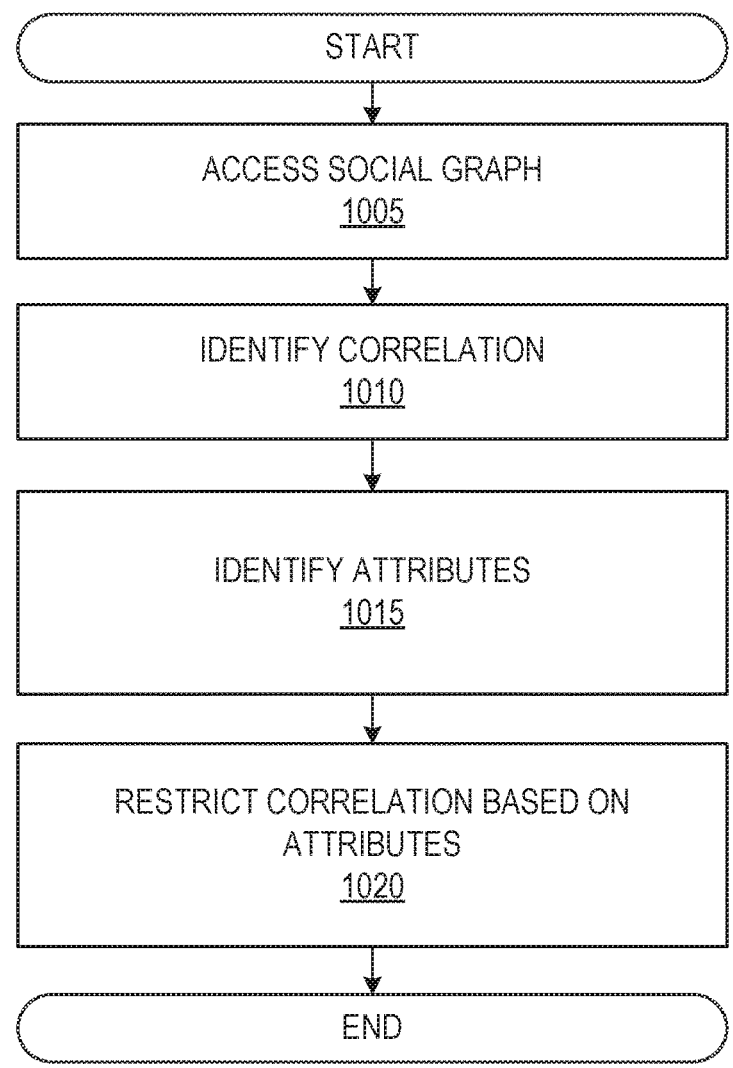
FIG. 10 is a flow diagram illustrating an example method for correlation generation, according to an example embodiment.

FIG. 10 is a flow diagram illustrating an example method 1000 for correlation generation, according to an example embodiment. At operation 1005, the data connector engine 230 accesses the social graph data in database 130. At operation 1010, the attribute engine 235 determines a correlation or overlap between respective internal users and external users. At operation 1015, the attribute engine 235 may be identified from the search string and used to restrict the amount of correlation (e.g., matches, overlap) between the internal users and external users. The attributes may be specified from a search string received from a internal user conducting a search.

Figure 11:
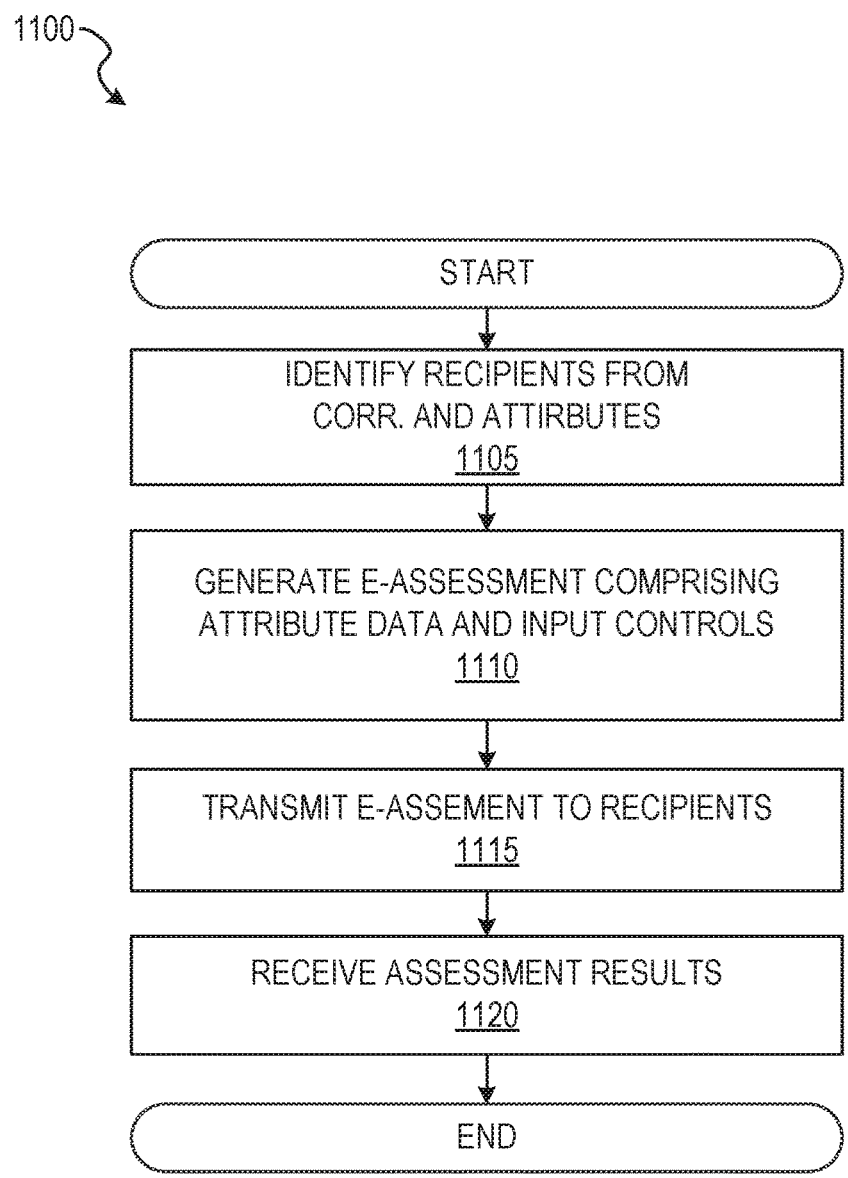
FIG. 11 is a flow diagram illustrating an example method for assessment generation, according to an example embodiment.

FIG. 11 is a flow diagram illustrating an example method 1100 for assessment generation, according to an example embodiment. At operation 1105, the assessment engine 240 identifies which external users are in the correlation restricted by attributes. At operation 1110, the assessment engine 240 generates an electronic assessment that includes a reference to the attribute data. The electronic assessment may include displayable input controls as discussed with reference to FIG. 12 below. The input controls are user interface elements that allow the internal user 160 to fill out the electronic assessment. At operation 1115, the assessment engine 240 transmits the electronic assessment to the client devices 150B through the transmission engine 205.

Figure 12:
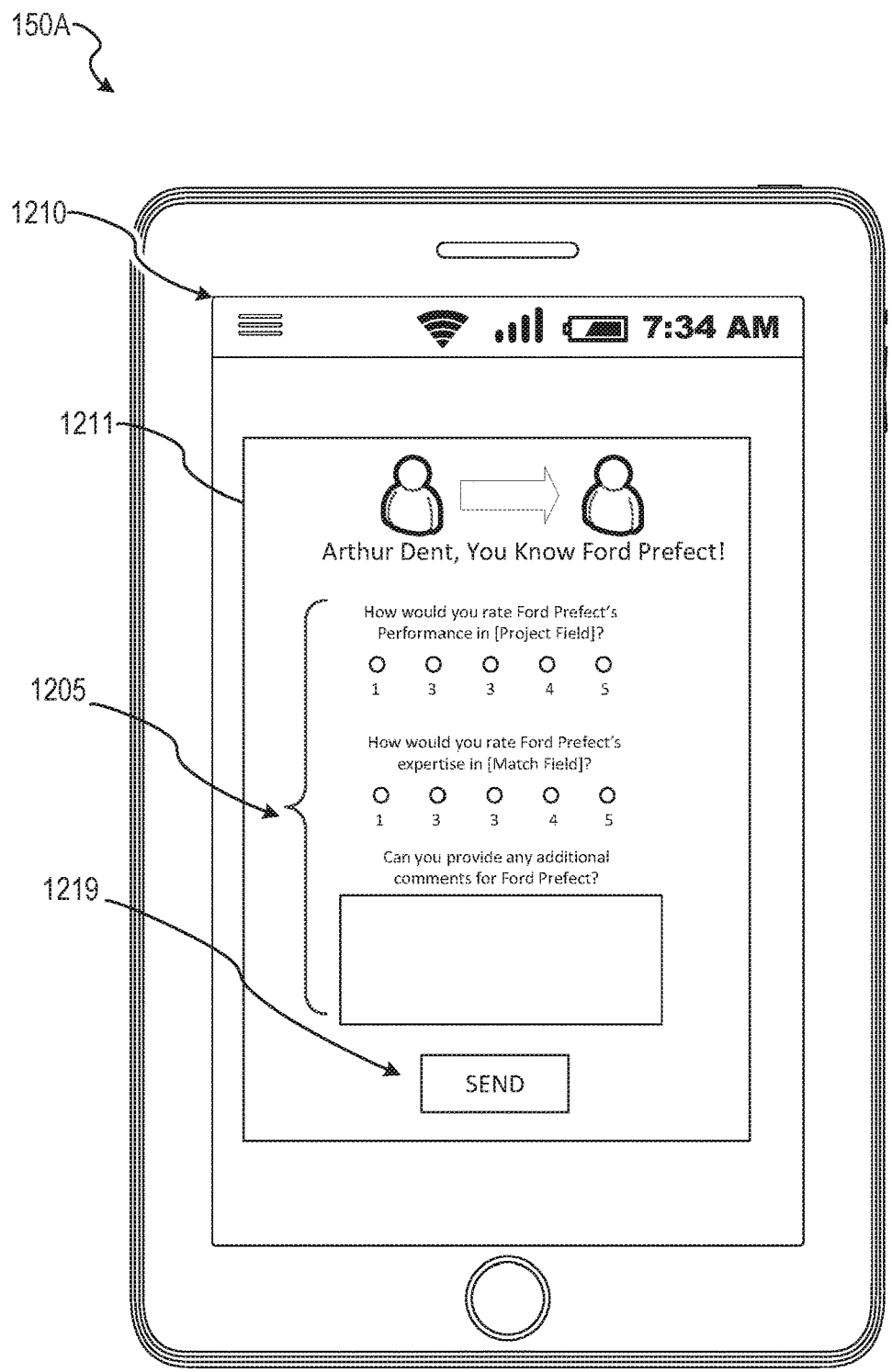
FIG. 12 is a client device having a user interface with an assessment displayed, according to an example embodiment.

FIG. 12 illustrates an example client device 150A implemented as a tablet. Client device 150A may display an electronic assessment 1211 on a display screen 1210. The electronic assessment 1211 comprises one or more input controls 1205. For example, the input controls 1205 may include check boxes 1-5, dropdown boxes, or text-entry fields. The questions that correspond to the input controls 1205 have general descriptive portions, for example: "How would you rate [Internal User Attribute Name Field]'s performance in the [Project Attribute Field]?", where the non-bracketed portions of the question are general to all internal users. The questions may further have fields that assessment engine 240 auto-populates with attributes of the external user and/or attributes shared between the internal user and the external user. For example, the internal user's name attribute may be "Ford Prefect" and the internal user's Project Attribute field that is shared with the internal user may be "Spring Database Project". Thus, the above example question then becomes "How would you rate Ford Prefect's performance in the Spring Database Project?" As illustrated, electronic assessment 1211 may further include a submit button 1219 that went selected/clicked submits the assessment results (e.g., selected checkboxes, comments in text area) to the assessment engine 240.

Figure 13:
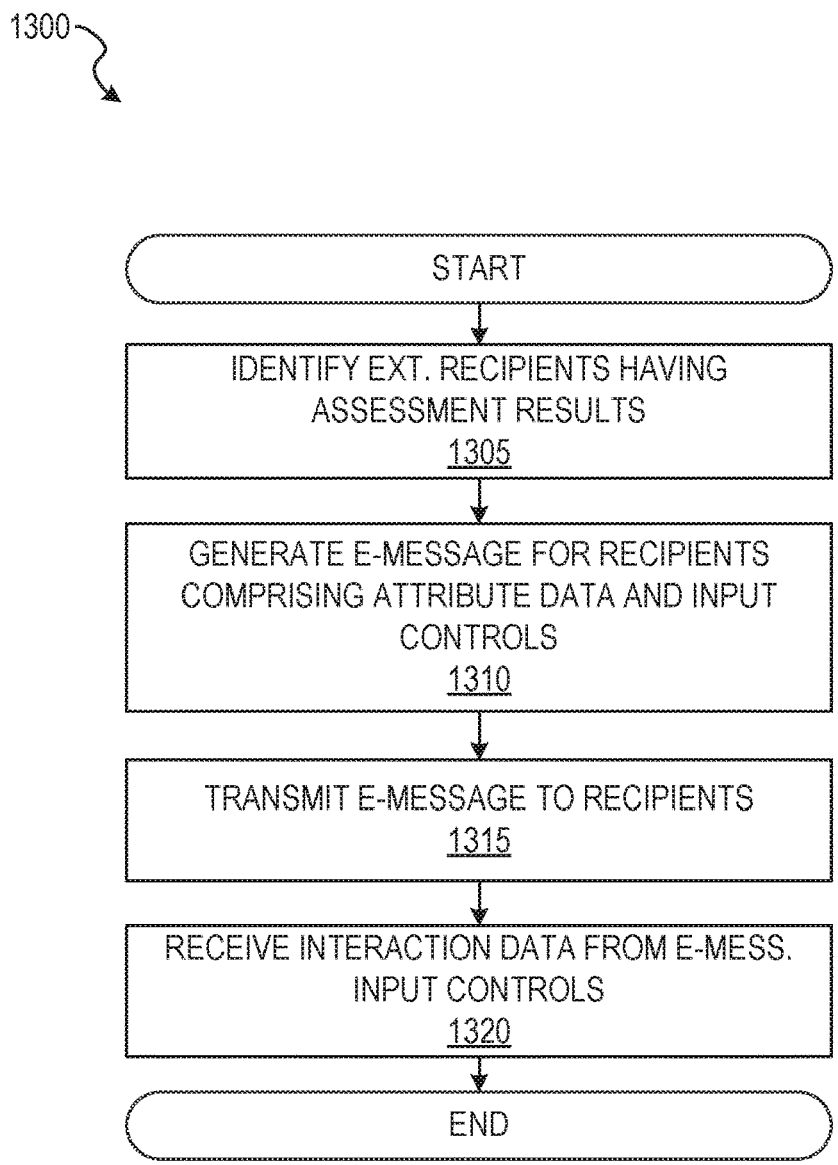
FIG. 13 is a flow diagram illustrating an example method for assessment result and interaction control, according to an example embodiment.

FIG. 13 is a flow diagram illustrating an example method 1300 for assessment result and interaction control, according to an example embodiment. At operation 1305, the contact engine 245 identifies or selects external recipients having assessment results (e.g., external users for which assessment results were generated by internal users).

In some embodiments, the contact engine 245 determines whether assessment results contain are positive or negative results. Positive or negative results may be generated from input data. For example, using interface control 1205, the internal user may rate the external user 1 out of 5 for performance on a given project; or the internal user may rate the external user 3 out of 5 for performance on the given project. In those embodiments, the input data may be categorized into different categories, such as positive feedback or negative feedback. For example, anything above 3 out of 5 may be categorized as positive feedback, while 3 or below may be categorized as negative feedback. The limit (e.g., 3) may be configured per implementation. For example, in some embodiments, any feedback 2 out of 5 may be categorized as positive. Further in some embodiments, other input controls such as sliders, or binary results (e.g., yes/no results) may similar be categorized as positive or negative feedback. In those embodiments, as an example, a limit may be set on the slider such that any feed back past the limit would be categorized as positive feedback. Yes/no results may be similarly handled: yes may be categorized as positive feedback and no as negative (or vice versa, depending on how the question is set up). Further, in some embodiments, input data entered into the text entry fields, such as the "additional comments" box in FIG. 12, may be categorized as positive or negative feedback by a internal user. For example, an internal user (e.g., an internal user other than the internal user that created the assessment results) may read input data entered into the additional comment area and categorize it as positive or negative.

In some embodiments, the contact engine 245 first determines which external users have assessment results. Of the external users that have assessment results, the contact engine 245 may analyze and categorize the assessment results as having positive or negative feedback data using the above approach. In those embodiments, the contact engine 245 then selects subset of external users that have positive feedback in the assessment results to receive an electronic message.

At operation 1310, the contact engine 245 generates an electronic message for the selected external recipients. In some embodiments, the electronic message comprises references to the attribute data (e.g., shared attributes) and data from the assessment results (e.g., positive reviews in the assessment results). At operation 1315, the contact engine 245 interfaces with the transmission engine 205 to transmit the electronic message to the recipients. At operation 1320, the external users may interact with the electronic message, for example by opening the electronic message or clicking on links within the electronic message. In some embodiments, the electronic message is sent through a messaging service of the social networking system 120, which is capable of determining when an email message has been opened (e.g., via a message body request). In some embodiments, the electronic message is transmitted to the recipients through a third party email application (e.g., third party application 148) run from a third party server (e.g., third party server(s) 146). In those embodiments using a third party email application, the electronic message comprises display objects (e.g., images, text, content) that load from the social networking system 120; when the electronic message is opened, the social networking system 120 receives a request for the display objects and opening of the electronic message may be stored as interaction data in database 132. In some embodiments, the electronic message comprises links to blogs, posts, or pages served from the third party server(s) 146 or social networking system 120. When an internal user such as user 160 selects/clicks on the links, interaction data is generated (e.g., by creating data indicating that the internal user requested the linked to content) and stored in database 132.

Figure 14:
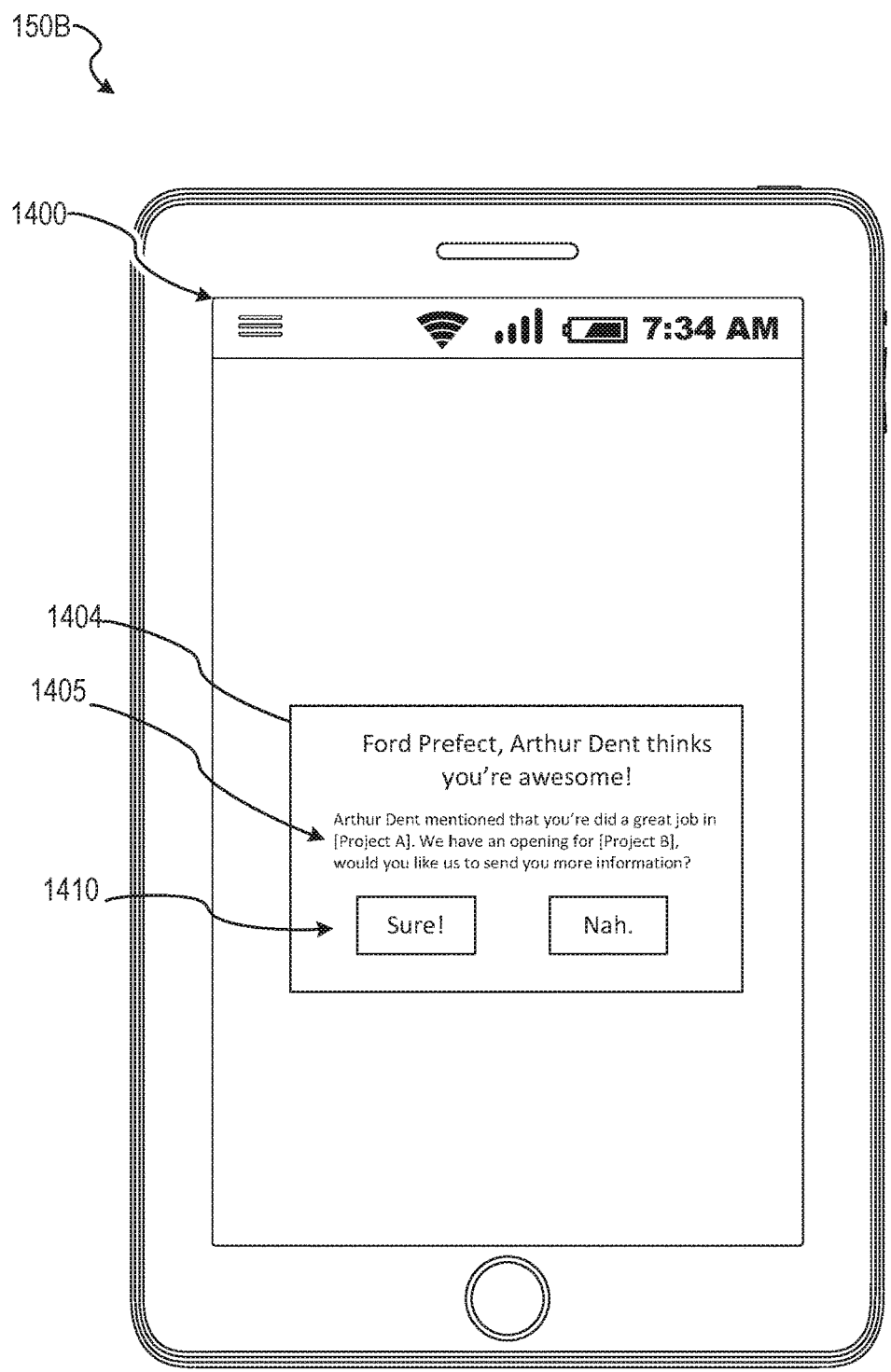
FIG. 14 is a client device having a user interface with electronic messaging and assessment result data displayed, according to an example embodiment.

FIG. 14 illustrates client device 150B, according to some embodiments. As shown, client device 150B displays the electronic message 1404 on a display screen 1400 of client device 150B. Electronic message 1404 comprises description data 1405. The description data 1405 comprises assessment results (e.g., "you're awesome", "great job") and data of the one or more attributes (e.g., "[Project A]"). In some embodiments, the assessment results sent in the electronic message may reference the project or company as shown in FIG. 14; while in some embodiments, the assessment results may leave out referencing specific projects/companies. This may occur where the assessment results contain positive feedback, however reference to specific reasons or performance on certain projects was not received from the internal user. The description data 1405 may further reference other data such job openings, or links to other blogs, posts, and pages. In some embodiments, the electronic message 1404 comprises one or more buttons 1410 that further allow the external user to interact with the electronic message 1404 and generate interaction data.

Figure 15:
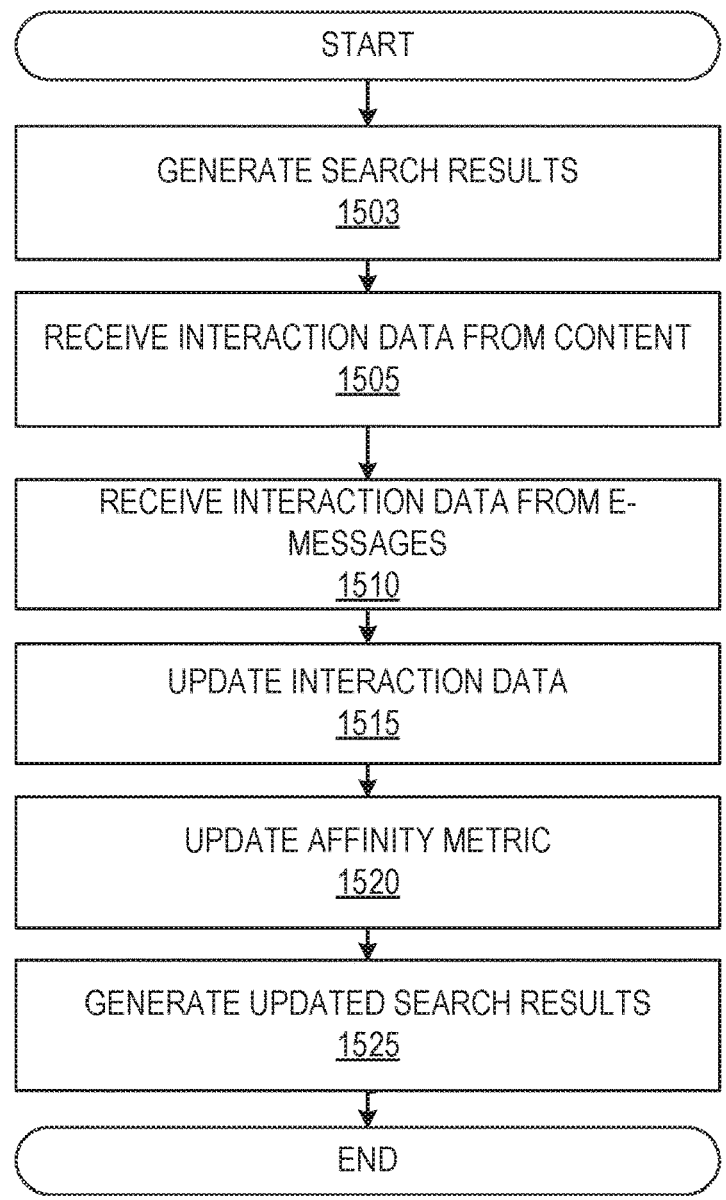
FIG. 15 is a flow diagram illustrating an example method for generating improved search results, according to an example embodiment.

FIG. 15 is a flow diagram illustrating an example method 1500 for generating improved search results, according to an example embodiment. At operation 1503, the search engine connector 200, in response to receiving a search string from a user performing a search (e.g., internal user 160), generates search results as discussed above (e.g., accessing social graph data in database 130 and profile data in database 128). If the search string specifies that the results should include external users that have a high match metric and affinity metric, the returned search results may include little or no results (e.g., no highly matched candidates have an affinity for social networking system 120 or a company associated with social networking system 120). To actively improve search results by creating interaction data and affinity, the social routing subgroup 260 and assessment routing subgroup 265 may perform the social routing of content and assessment routing of messages to generate interaction data as discussed above. Continuing as an example, at operation 1505, the content engine 225 receives interaction data from the social routed content, such as an item of content 815. At operation 1510, the contact engine 245 receives interaction data from the electronic message, such as electronic message 1404.

At operation 1515, the interaction data received at operations 1505 and 1510 is used to update database 132 (e.g., update interaction data in database 132) and update database 130 (e.g., update any new connections caused from interactions). At operation 1520, affinity engine 210 may update the affinity metric for one or more external users using the updated interaction data of operation 1515. At operation 1525, the search engine 203 generates updated search results responsive to a search string specifying that results include high-match/high-affinity results. Notably, the search results generated at operation 1525 may include more results due to the search engine connector 200 taking active steps to improve results by modifying affinity metrics (e.g., through interaction data updates).

Figure 16:
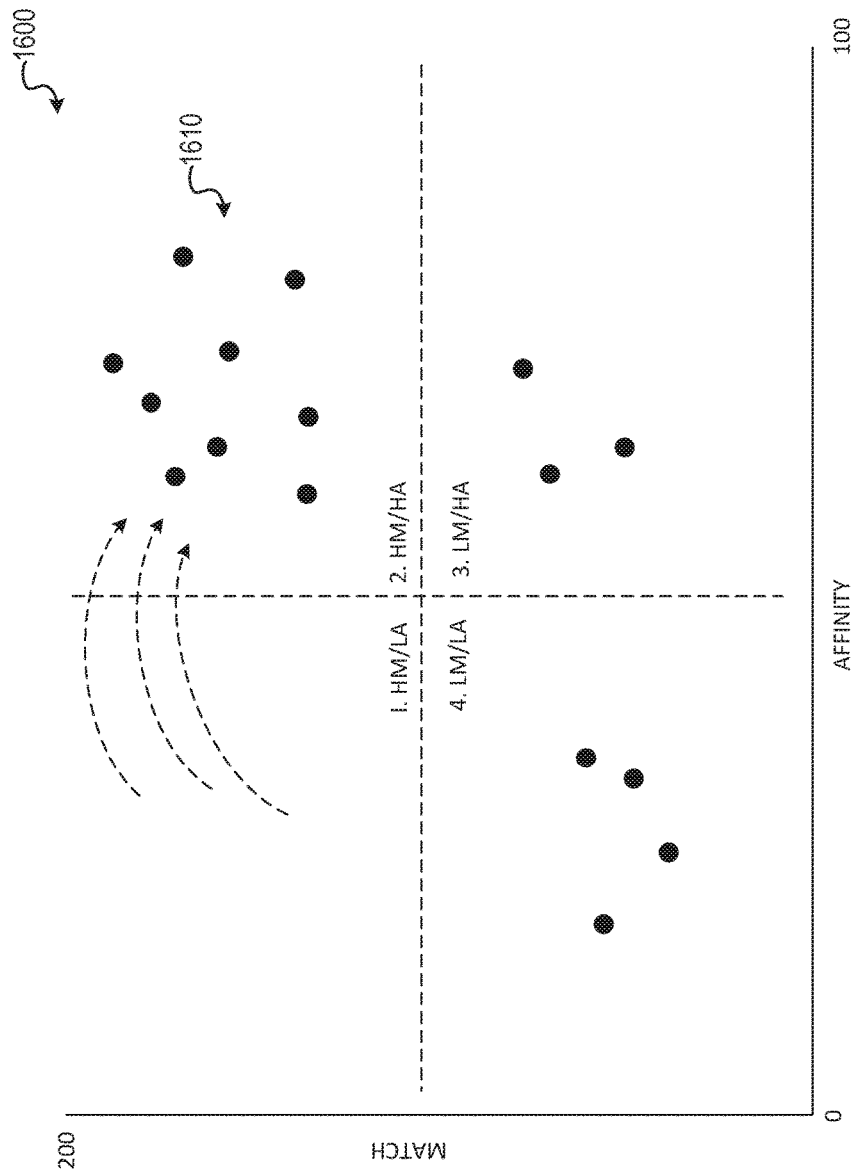
FIG. 16 is an interface diagram illustrating transitioned network entity data points, according to an example embodiment.

FIG. 16 shows user interface 1600 of FIG. 7 with transitioned user data points, according to an example embodiment. The user interface 1600 shows a number of user data points transitioning from category 1 (high-match/low-data) to a group of user data points 1610 in category 2 (high-match/high-affinity), as illustrated by the dotted arrows, which may in some embodiments be displayed within user interface 1600 to show changes between the categories. The resulting groups of user data points 1610 may then be used to generate updated search results.

Figure 17:
FIG. 17 is an interface diagram illustrating search results generated from limited network entity data points, according to an example embodiment.

FIGS. 17 and 18 illustrate initial search results and improved search results, as according to some embodiments. In particular, FIG. 17 shows an initial search result user interface 1700, the results of which may be generated in operation 1503 (FIG. 15). As illustrated, the initial search results 1705 for high-match/high-affinity results only include two users. FIG. 18 shows updated search results 1805, resulting from the transitioned user data points 1610.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, engines, methods, interfaces, applications and so forth described in conjunction with FIGS. 1-18 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines configured for particular purposes. For example, a particular hardware architecture coupled with a particular software architecture will create a mobile device, such as a mobile phone, tablet device, and the like. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein. Further, though computing devices, e.g., client devices 150A-B, have been illustrated as a mobile device (e.g., tablet), one of ordinary skill in the art appreciates that the approaches discussed are likewise implementable using desktops, laptops, virtual machines, operating system level virtualization (e.g., Linux containers), and the like.

Figure 19:
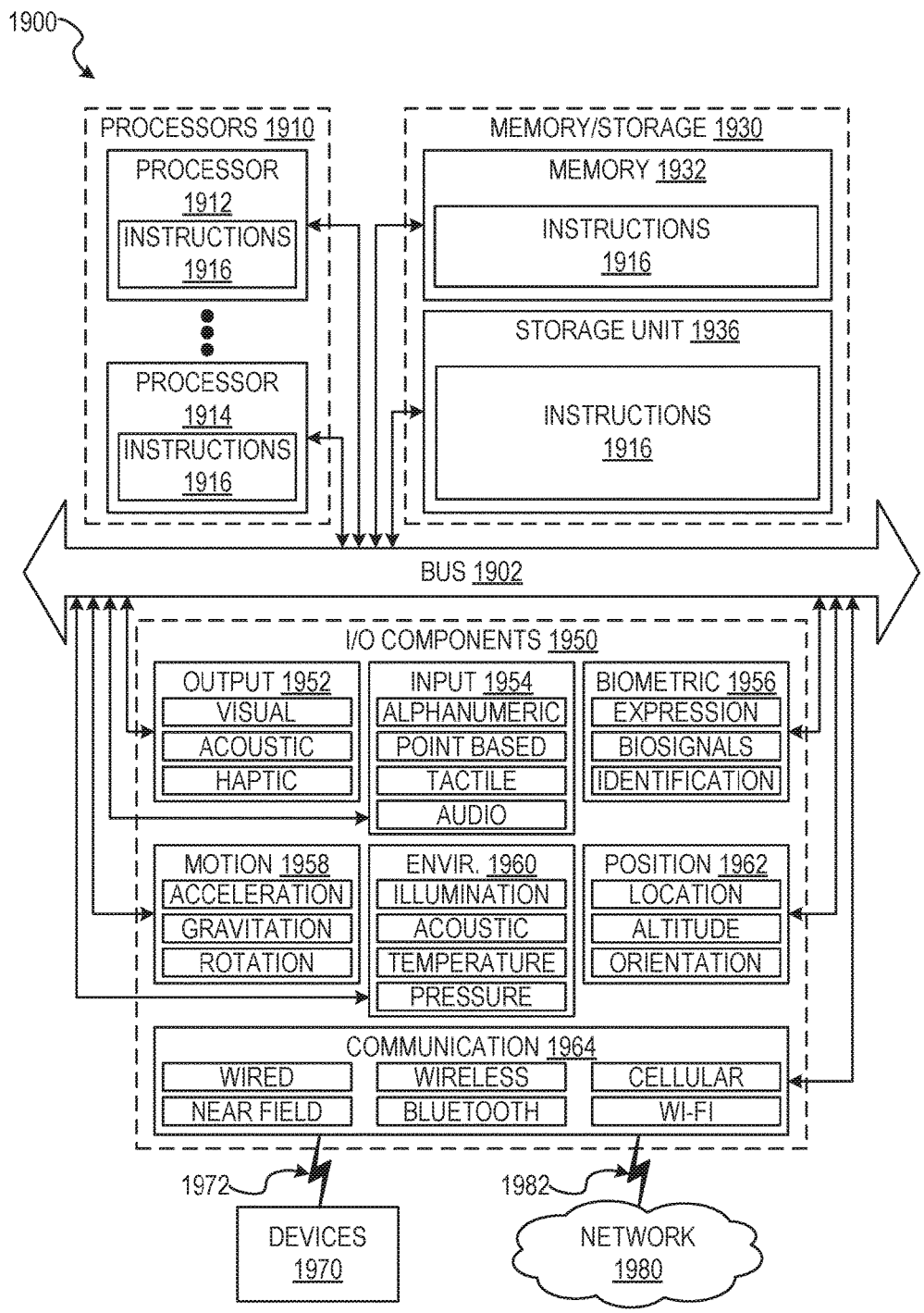
FIG. 19 illustrates a diagrammatic representation of a machine in the form of a computer system within which a set of instructions may be executed for causing the machine to perform any one or more of the methodologies discussed herein, according to an example embodiment.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein can be executed. For example, the instructions 1916 can cause the machine 1900 to execute the flow diagrams of FIGS. 3-6, 9-11, 13, and 15. Additionally, or alternatively, the instruction 1916 can implement the search engine 203, transmission engine 205, an affinity engine 210, a match engine 215, a correlator engine 220, a content engine 225, a data connector engine 230, an attribute engine 235, an assessment engine 240, a contact engine 245, and a display engine 250 of FIG. 2, and so forth.

The instructions 1916 transform the general, non-programmed machine into a particular machine programmed to carry out the described and illustrated functions in the manner described. In alternative embodiments, the machine 1900 operates as a standalone device or can be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

The machine 1900 can include processors 1910, memory/storage 1930, and I/O components 1950, which can be configured to communicate with each other such as via a bus 1902. In an example embodiment, the processors 1910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1912 and processor 1914 that may execute instructions 1916. The term "processor" is intended to include multi-core processor that may comprise two or more independent processors (sometimes referred to as "cores") that can execute instructions contemporaneously. Although FIG. 19 shows multiple processors 1910, the machine 1900 may include a single processor with a single core, a single processor with multiple cores (e.g., a multi-core processor), multiple processors with a single core, multiple processors with multiples cores, or any combination thereof.

The memory/storage 1930 can include a memory 1932, such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 can also reside, completely or partially, within the memory 1932, within the storage unit 1936, within at least one of the processors 1910 (e.g., within the processor's cache memory), or any suitable combination thereof, during execution thereof by the machine 1900. Accordingly, the memory 1932, the storage unit 1936, and the memory of the processors 1910 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1916. The term "machine-readable medium" shall also be taken to include any medium, or combination of multiple media, that is capable of storing instructions (e.g., instructions 1916) for execution by a machine (e.g., machine 1900), such that the instructions, when executed by one or more processors of the machine 1900 (e.g., processors 1910), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1950 can include a wide variety of components to receive input, provide output, produce output, transmit information, exchange information, capture measurements, and so on. The specific I/O components 1950 that are included in a particular machine will depend on the type of machine. For example, portable machines such as mobile phones will likely include a touch input device or other such input mechanisms, while a headless server machine will likely not include such a touch input device. It will be appreciated that the I/O components 1950 can include many other components that are not shown in FIG. 19. The I/O components 1950 are grouped according to functionality merely for simplifying the following discussion, and the grouping is in no way limiting. In various example embodiments, the I/O components 1950 can include output components 1952 and input components 1954. The output components 1952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1950 can include biometric components 1956, motion components 1958, environmental components 1960, or position components 1962 among a wide array of other components. For example, the biometric components 1956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 can include acceleration sensor components (e.g., an accelerometer), gravitation sensor components, rotation sensor components (e.g., a gyroscope), and so forth. The environmental components 1960 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1962 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 include a network interface component or other suitable device to interface with the network 1980. In further examples, communication components 1964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1970 may be another machine or any of a wide variety of peripheral devices (e.g., a peripheral device coupled via a Universal Serial Bus (USB)).

Moreover, the communication components 1964 can detect identifiers or include components operable to detect identifiers. For example, the communication components 1964 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or other type of cellular or wireless coupling. In this example, the coupling 1982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1916 can be transmitted or received over the network 1980 using a transmission medium via a network interface device (e.g., a network interface component included in the communication components 1964) and utilizing any one of a number of well-known transfer protocols (e.g., Hypertext Transfer Protocol (HTTP)). Similarly, the instructions 1916 can be transmitted or received using a transmission medium via the coupling 1972 (e.g., a peer-to-peer coupling) to devices 1970. The term "transmission medium" shall be taken to include any intangible medium that is capable of storing, encoding, or carrying the instructions 1916 for execution by the machine 1900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving a search string comprising search parameters;
   retrieving, from profile data in a database of the network platform, results for users that correspond to the search parameters, the identifiers including an identifier of a user;
   determining, via one or more processors of a machine, an affinity metric of the user based on social graph data associated with the identifier, the social graph data indicating social links between the user and one or more network objects of the network platform, the affinity metric describing a network interaction level for the user;
   determining, via the one or more processors of the machine, a match metric of the user based on corresponding user profile data from the the network platform, the user profile data comprising profile parameters for the user that are accessible through the network platform, the match metric describing a correlation between the profile parameters of the user and the search parameters of the search string;
   determining that the affinity metric is lower than the match metric; and
   responsive to the determination, transmitting one or more items of content that are associated with the network platform for display on a user device of the user.

2. The computer-implemented method of claim 1, wherein the affinity metric indicates a level of user-initiated network interactions between the user and the one or more network objects; and wherein:
   the determining comprises determining that the affinity metric is lower than the match metric by a pre-determined amount.

3. The computer-implemented method of claim 1, wherein the one or more items of content comprise content displayed within one or more pages of the network platform, the one or more items of content being displayed while the user is viewing the one or more pages of the network platform through the user device.

4. The computer-implemented method of claim 1, wherein the one or more items of content comprise content displayed within one or more pages of a third party server, the one or more items of content being displayed while the user is viewing the one or more pages of the third party server through the user device.

5. The computer-implemented method of claim 4, wherein the identifier is used to determine that the user is viewing the one or more pages of the third party server through the user device.

6. The computer-implemented method of claim 1, wherein a network object of the one or more network objects is one or more other users of the network platform, a web content item corresponding to the network platform, electronic messages sent from the network platform to the user, or keywords in the user profile data of the user.

7. The computer-implemented method of claim 1, wherein the profile parameters comprise at least one or more of:
one or more keywords for skills of the user,
one or more keywords for work experience of the user,
one or more keywords for credentials of the user,
a numerical duration of time associated with the one or more keywords for skills for the user,
a numerical duration of time associated with the one or more keywords for work experience of the user,
or a numerical duration of time associated with the one or more keywords for credentials of the user.

8. A system comprising:
one or more processors of a machine; and
a memory storing instructions that, when executed by the one or more processors, cause the machine to at least:
receive a search string comprising search parameters;
retrieve, from profile data in a database of the network platform, results for users that correspond to the search parameters, the identifiers including an identifier of a user;
determine, via one or more processors of a machine, an affinity metric of the user based on social graph data associated with the identifier, the social graph data indicating social links between the user and one or more network objects of the network platform, the affinity metric describing a network interaction level for the user,
determine, via the one or more processors of the machine, a match metric of the user based on corresponding user profile data from the the network platform, the user profile data comprising profile parameters for the user that are accessible through the network platform, the match metric describing a correlation between the profile parameters of the user and the search parameters of the search string;
determine that the affinity metric is lower than the match metric; and
responsive to the determination, transmit one or more items of content that are associated with the network platform for display on a user device of the user.

9. The system of claim 8, wherein the affinity metric indicates a level of user-initiated network interactions between the user and the one or more network objects; and wherein:
the determining comprises determining that the affinity metric is lower than the match metric by a pre-determined amount.

10. The system of claim 8, wherein the one or more items of content comprise content displayed within one or more pages of the network platform, the one or more items of content being displayed while the user is viewing the one or more pages of the network platform through the user device.

11. The system of claim 8, wherein the one or more items of content comprise content displayed within one or more pages of a third party server, the one or more items of content being displayed while the user is viewing the one or more pages of the third party server through the user device.

12. The system of claim 11, wherein the identifier is used to determine that the user is viewing the one or more pages of the third party server through the user device.

13. The system of claim 8, wherein a network object of the one or more network objects is one or more other users of the network platform, a web content item corresponding to the network platform, electronic messages sent from the network platform to the user, or keywords in the user profile data of the user.

14. The system of claim 8, wherein the profile parameters comprise at least one or more of:
one or more keywords for skills of the user,
one or more keywords for work experience of the user,
one or more keywords for credentials of the user,
a numerical duration of time associated with the one or more keywords for skills for the user,
a numerical duration of time associated with the one or more keywords for work experience of the user,
or a numerical duration of time associated with the one or more keywords for credentials of the user.

15. A non-transitory machine-readable storage medium embodying instructions that, when executed by a machine, cause the machine to perform operations comprising:
receive a search string comprising search parameters;
retrieve, from profile data in a database of the network platform, results for users that correspond to the search parameters, the identifiers including an identifier of a user;
determine, via one or more processors of a machine, an affinity metric of the user based on social graph data associated with the identifier, the social graph data indicating social links between the user and one or more network objects of the network platform, the affinity metric describing a network interaction level for the user;
determine, via the one or more processors of the machine, a match metric of the user based on corresponding user profile data from the the network platform, the user profile data comprising profile parameters for the user that are accessible through the network platform, the match metric describing a correlation between the profile parameters of the user and the search parameters of the search string;
determine that the affinity metric is lower than the match metric; and
responsive to the determination, transmit one or more items of content that are associated with the network platform for display on a user device of the user.

16. The computer-readable storage medium of claim 15, wherein the affinity metric indicates a level of user-initiated network interactions between the user and the one or more network objects; and wherein:
the determining comprises determining that the affinity metric is lower than the match metric by a pre-determined amount.

17. The computer-readable storage medium of claim 15, wherein the one or more items of content comprise content displayed within one or more pages of the network platform, the one or more items of content being displayed while the user is viewing the one or more pages of the network platform through the user device.

18. The computer-readable storage medium of claim 15, wherein the one or more items of content comprise content displayed within one or more pages of a third party server, the one or more items of content being displayed while the user is viewing the one or more pages of the third party server through the user device.

19. The computer-readable storage medium of claim 18, wherein the identifier is used to determine that the user is viewing the one or more pages of the third party server through the user device.

20. The computer-readable storage medium of claim 15, wherein a network object of the one or more network objects is one or more other users of the network platform, a web content item corresponding to the network platform, electronic messages sent from the network platform to the user, or keywords in the user profile data of the user.

* * * * *

UNITED STATES PATENT AND TRADEMARK OFFICE
CERTIFICATE OF CORRECTION

PATENT NO. : 10,037,359 B2
APPLICATION NO. : 15/162007
DATED : July 31, 2018
INVENTOR(S) : Tague et al.

Page 1 of 1

It is certified that error appears in the above-identified patent and that said Letters Patent is hereby corrected as shown below:

In the Claims

In Column 26, Line 44, in Claim 1, delete "the the" and insert --the-- therefor

In Column 27, Line 44, in Claim 8, delete "user," and insert --user;-- therefor

In Column 27, Line 47, in Claim 8, delete "the the" and insert --the-- therefor

In Column 28, Line 46, in Claim 15, delete "the the" and insert --the-- therefor Signed and Sealed this
Twenty-eighth Day of May, 2019

Andrei Iancu
*Director of the United States Patent and Trademark Office*